(12) United States Patent
Bickford

(10) Patent No.: US 11,597,579 B2
(45) Date of Patent: Mar. 7, 2023

(54) BOTTLE APPARATUS

(71) Applicant: Brenda Bickford, Lincoln, NE (US)

(72) Inventor: Brenda Bickford, Lincoln, NE (US)

( * ) Notice: Subject to any disclaimer, the term of this patent is extended or adjusted under 35 U.S.C. 154(b) by 390 days.

(21) Appl. No.: 16/856,677

(22) Filed: Apr. 23, 2020

(65) Prior Publication Data

US 2020/0339334 A1 Oct. 29, 2020

Related U.S. Application Data

(60) Provisional application No. 62/837,571, filed on Apr. 23, 2019.

(51) Int. Cl.
| | |
|---|---|
| *B65D 81/32* | (2006.01) |
| *B65D 1/04* | (2006.01) |
| *B05B 11/00* | (2006.01) |

(52) U.S. Cl.
CPC ............... *B65D 81/32* (2013.01); *B65D 1/04* (2013.01); *B05B 11/3084* (2013.01)

(58) Field of Classification Search
CPC ........ B65D 1/04; B65D 81/32; B65D 81/325; B65D 81/3244; B65D 81/3238; B05B 11/3084; A61J 1/2093
USPC .............................................. 206/219, 459.5
See application file for complete search history.

(56) References Cited

U.S. PATENT DOCUMENTS

| | | | | | |
|---|---|---|---|---|---|
| 4,856,995 | A * | 8/1989 | Wagner | ..................... | A61J 9/00 215/11.4 |
| 4,950,083 | A * | 8/1990 | Bavaveas | ........... | B65D 21/0237 222/129 |
| 5,152,431 | A * | 10/1992 | Gardner | ............... | B05B 11/3081 222/144.5 |
| 5,346,097 | A * | 9/1994 | Melland | ................. | B65D 41/18 222/546 |
| 5,447,245 | A * | 9/1995 | Merhar | .............. | B65D 21/0204 215/DIG. 8 |
| 5,881,918 | A * | 3/1999 | Eichler | ............... | B05B 11/3084 222/321.9 |
| 6,604,655 | B1 * | 8/2003 | Lee | ...................... | B05B 11/3084 222/135 |
| 8,616,390 | B2 * | 12/2013 | Kountotsis | ................ | F25D 3/08 222/137 |
| 9,499,315 | B1 * | 11/2016 | Lue | ......................... | B65D 23/00 |
| 10,507,165 | B2 * | 12/2019 | Di Naro | ................ | A61J 1/2024 |
| 2001/0031170 | A1 * | 10/2001 | Voiers | .................... | B65D 81/32 401/196 |
| 2007/0267378 | A1 * | 11/2007 | Piccinino | ................. | B65D 1/04 215/6 |

(Continued)

*Primary Examiner* — Rafael A Ortiz

(74) *Attorney, Agent, or Firm* — Suiter Swantz pc llo

(57) ABSTRACT

A bottle apparatus is disclosed. The bottle apparatus includes body including a plurality of sidewalls. The body is divided into a first body and an additional body via one or more dividing members. A cavity of the first body is configured to hold a concentrated product and a cavity of the additional body is configured to hold the concentrated product and a diluent to form a diluted product. The bottle apparatus includes a plurality of openings arranged on a top wall of the body. The bottle apparatus includes one or more transfer members configured to couple to a portion of the plurality of openings. The one or more transfer members are configured to dispense at least one of the diluted product, the concentrated product, or the diluent.

10 Claims, 24 Drawing Sheets

(56) References Cited

U.S. PATENT DOCUMENTS

| | | | |
|---|---|---|---|
| 2012/0222976 A1* | 9/2012 | Cave | B65D 1/18 |
| | | | 206/219 |
| 2012/0298543 A1* | 11/2012 | Davis | D06F 3/00 |
| | | | 206/459.5 |
| 2013/0240563 A1* | 9/2013 | Kraenzle | B65D 1/323 |
| | | | 222/129 |
| 2014/0252039 A1* | 9/2014 | Jennings | B65D 25/56 |
| | | | 222/158 |
| 2016/0058224 A1* | 3/2016 | Weitman | A47G 19/23 |
| | | | 206/459.5 |
| 2017/0028422 A1* | 2/2017 | Martines | B65D 21/0201 |
| 2017/0065058 A1* | 3/2017 | Ki | A45D 40/0075 |
| 2018/0179059 A1* | 6/2018 | Almås | B01J 19/24 |

\* cited by examiner 116, 518
116, 518
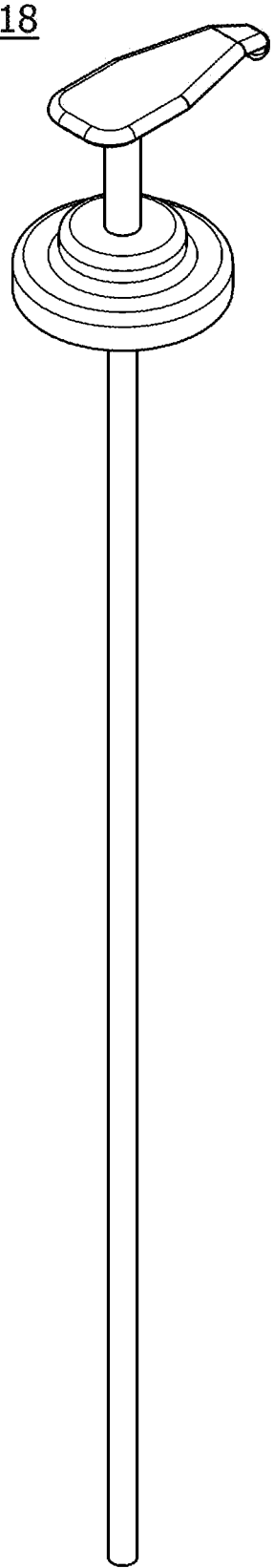
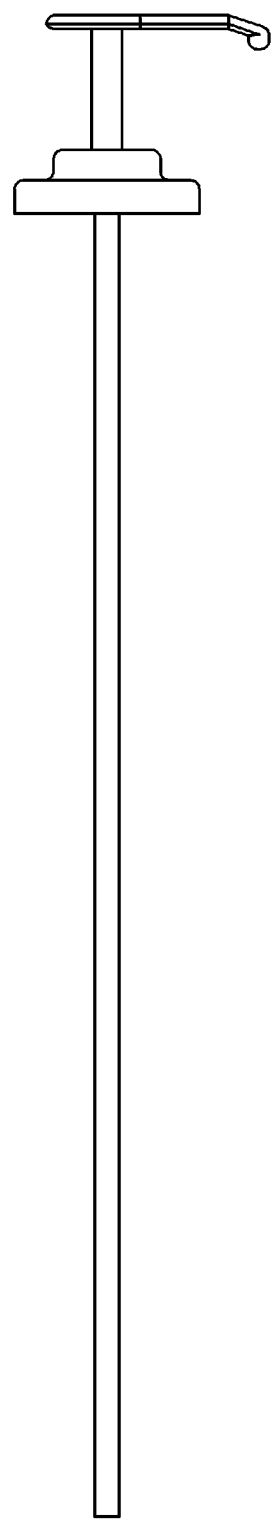
FIG. 15A
FIG. 15B 116, 518

BOTTLE APPARATUS

CROSS-REFERENCE TO RELATED APPLICATION

The present application claims priority to U.S. Provisional Patent Application No. 62/837,571, filed Apr. 23, 2019, entitled BOTTLE APPARATUS, naming Brenda Bickford as inventor, which is incorporated herein by reference in the entirety.

TECHNICAL FIELD

The present invention generally relates to the field of bottle apparatuses, and more particularly, a bottle apparatus for diluting concentrated products.

BACKGROUND

It is often desirable to dilute concentrated products (e.g., health and beauty products, cleaning products, industrial products, lawn and garden products, agricultural and farming products, food service or culinary products, or the like) with a diluent. Current bottle apparatuses require a user to add the diluent directly to the concentrated product such that the diluted product fills the entire bottle. Once a user adds the diluent to the concentrated product, the entire batch of concentrated product is diluted and there is no concentrated product left. In order for a user to use both a concentrated product and a diluted product, or to dilute a more concentrated product, the user must carry around at least two bottles.

Therefore, it would be desirable to provide an apparatus that cures the shortfalls of the previous approaches identified above.

SUMMARY

A bottle apparatus is disclosed. In one embodiment, the bottle apparatus includes a body, wherein the body includes a plurality of sidewalls, wherein the body is divided into a first body and an additional body via one or more dividing members, wherein a cavity of the first body is defined by an interior surface of the first body and a surface of the one or more dividing members, wherein a cavity of the additional body is defined by an interior surface of the additional body and a surface of the one or more dividing members, wherein the cavity of the first body is configured to hold a concentrated product, wherein the cavity of the additional body is configured to hold the concentrated product and a diluent to form a diluted product. In another embodiment, the bottle apparatus includes a plurality of openings, wherein the plurality of openings are arranged on a top wall of the body. In another embodiment, the bottle apparatus includes one or more transfer members, wherein the one or more transfer members are configured to couple to a portion of the plurality of openings, wherein the one or more transfer members are configured to dispense at least one of the diluted product, the concentrated product, or the diluent, wherein the plurality of openings include a first opening configured to couple to a first transfer member configured to dispense the concentrated product, wherein the diluted product of the additional body is formed by diluting the concentrated product dispensed from the first transfer member of the first opening with the diluent via a second opening of the additional body, wherein the plurality of openings include a third opening configured to couple to an additional transfer member configured to dispense the diluted product.

A bottle apparatus is disclosed. In one embodiment, the bottle apparatus includes a body, wherein the body includes a plurality of sidewalls, wherein the body is divided into a first body and an additional body via one or more dividing members, wherein a cavity of the first body is defined by an interior surface of the first body and a surface of the one or more dividing members, wherein a cavity of the additional body is defined by an interior surface of the additional body and a surface of the one or more dividing members, wherein the cavity of the first body is configured to hold a concentrated product, wherein the cavity of the additional body is configured to hold the concentrated product and a diluent to form a diluted product. In another embodiment, the bottle apparatus includes a plurality of openings, wherein the plurality of openings are arranged on a top wall of the body. In another embodiment, the bottle apparatus includes one or more transfer members, wherein the one or more transfer members are configured to couple to a portion of the plurality of openings, wherein the one or more transfer members are configured to dispense at least one of the diluted product, the concentrated product, or the diluent, wherein the plurality of openings include a first opening configured to couple to a first transfer member configured to dispense the concentrated product, wherein the diluted product of the additional body is formed by diluting the concentrated product dispensed from the first transfer member of the first opening with the diluent via a second opening of the additional body, wherein the plurality of openings include a third opening configured to couple to an additional transfer member configured to dispense the diluted product, wherein the body includes one or more recessed areas configured to couple to a measuring container.

A bottle apparatus is disclosed. In one embodiment, the bottle apparatus includes a body, wherein the body is divided into a first body and an additional body via one or more dividing members, wherein a cavity of the first body is defined by an interior surface of the first body and a surface of the one or more dividing members, wherein a cavity of the additional body is defined by an interior surface of the additional body and a surface of the one or more dividing members, wherein the cavity of the first body is configured to hold a concentrated product, wherein the cavity of the additional body is configured to hold the concentrated product and a diluent to form a diluted product. In another embodiment, the bottle apparatus includes a plurality of openings, wherein the plurality of openings are arranged on a top wall of the body. In another embodiment, the bottle apparatus includes one or more transfer members, wherein the one or more transfer members are configured to couple to a portion of the plurality of openings, wherein the one or more transfer members are configured to dispense at least one of the diluted product, the concentrated product, or the diluent.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 15A illustrates a transferring member of the bottle apparatus, in accordance with one or more embodiments of the present disclosure.

FIG. 15B illustrates a transferring member of the bottle apparatus, in accordance with one or more embodiments of the present disclosure.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Referring generally to FIGS. 1A-15F, a bottle apparatus is described, in accordance with one or more embodiments of the present disclosure.

Embodiments of the present disclosure are directed to a bottle apparatus. More particularly, embodiments of the present disclosure are directed to a bottle apparatus for a plurality of products with different concentration levels. Specifically, embodiments of the present disclosure are directed to a bottle apparatus for at least a concentrated product and a diluted product, wherein the concentrated product and the diluted product are contained within separate compartments of the bottle apparatus.

Figure 1A:
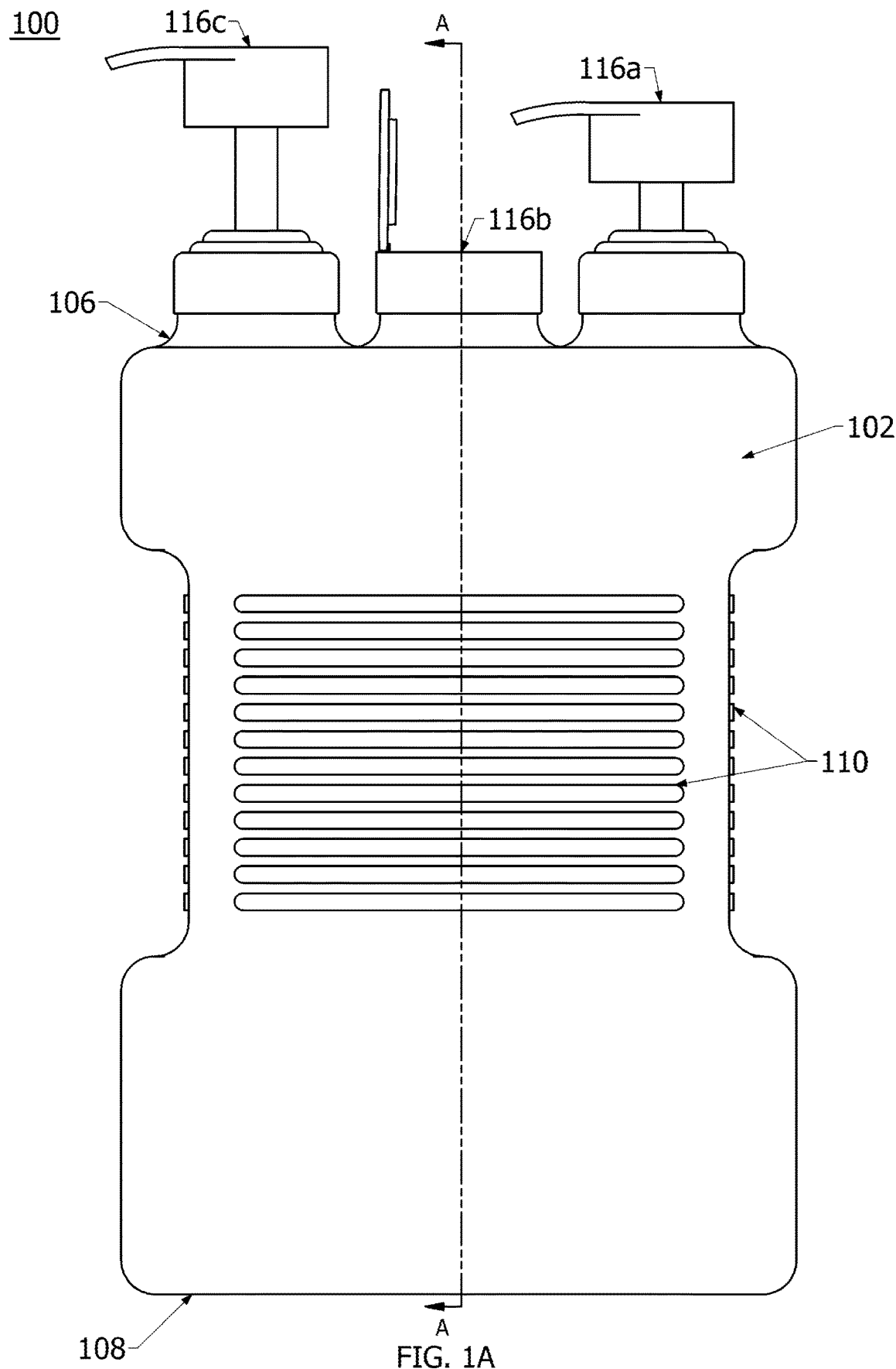
FIG. 1A illustrates a front view of a bottle apparatus, in accordance with one or more embodiments of the present disclosure.
Figure 1B:
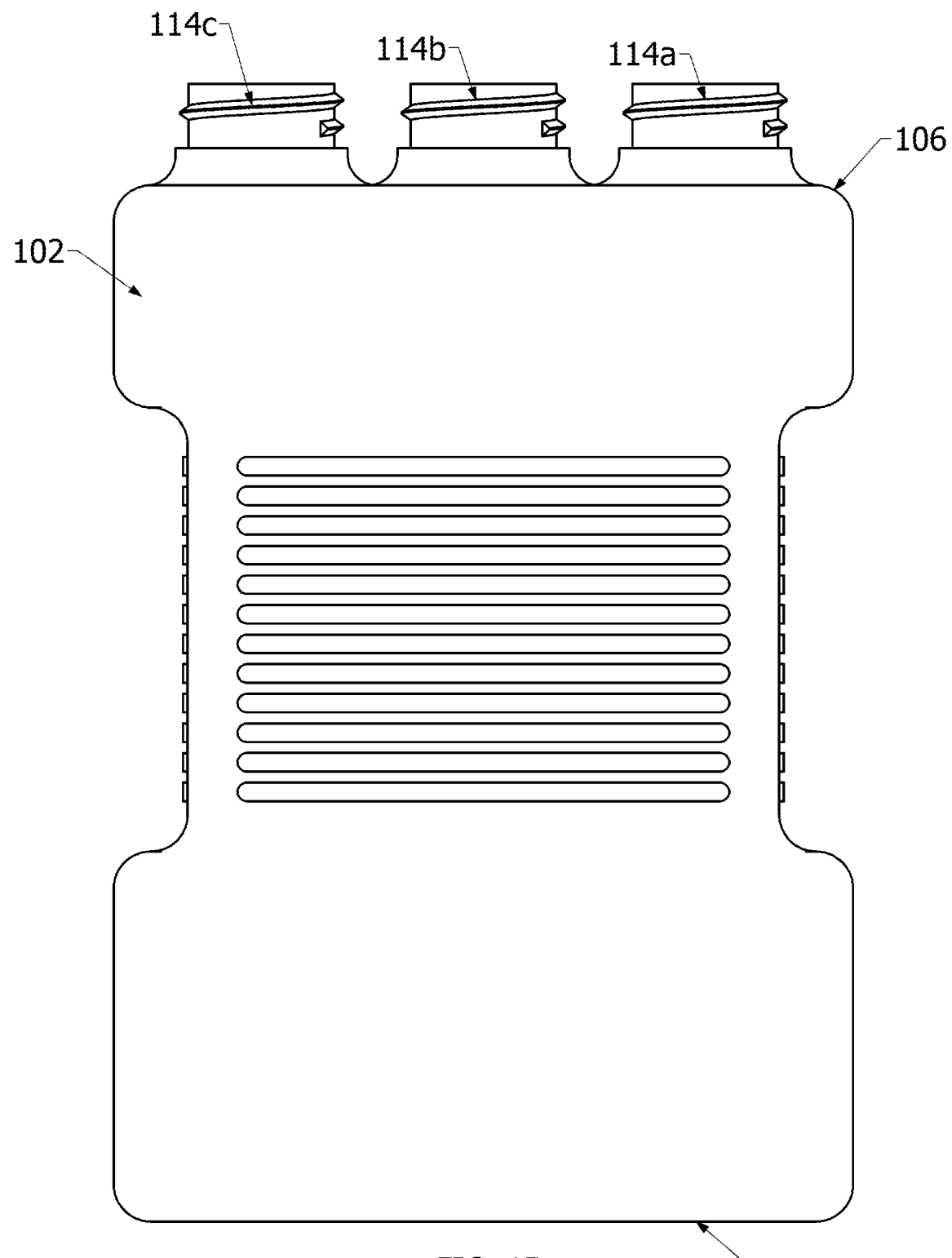
FIG. 1B illustrates an additional front view of the bottle apparatus, in accordance with one or more embodiments of the present disclosure.
Figure 4A:
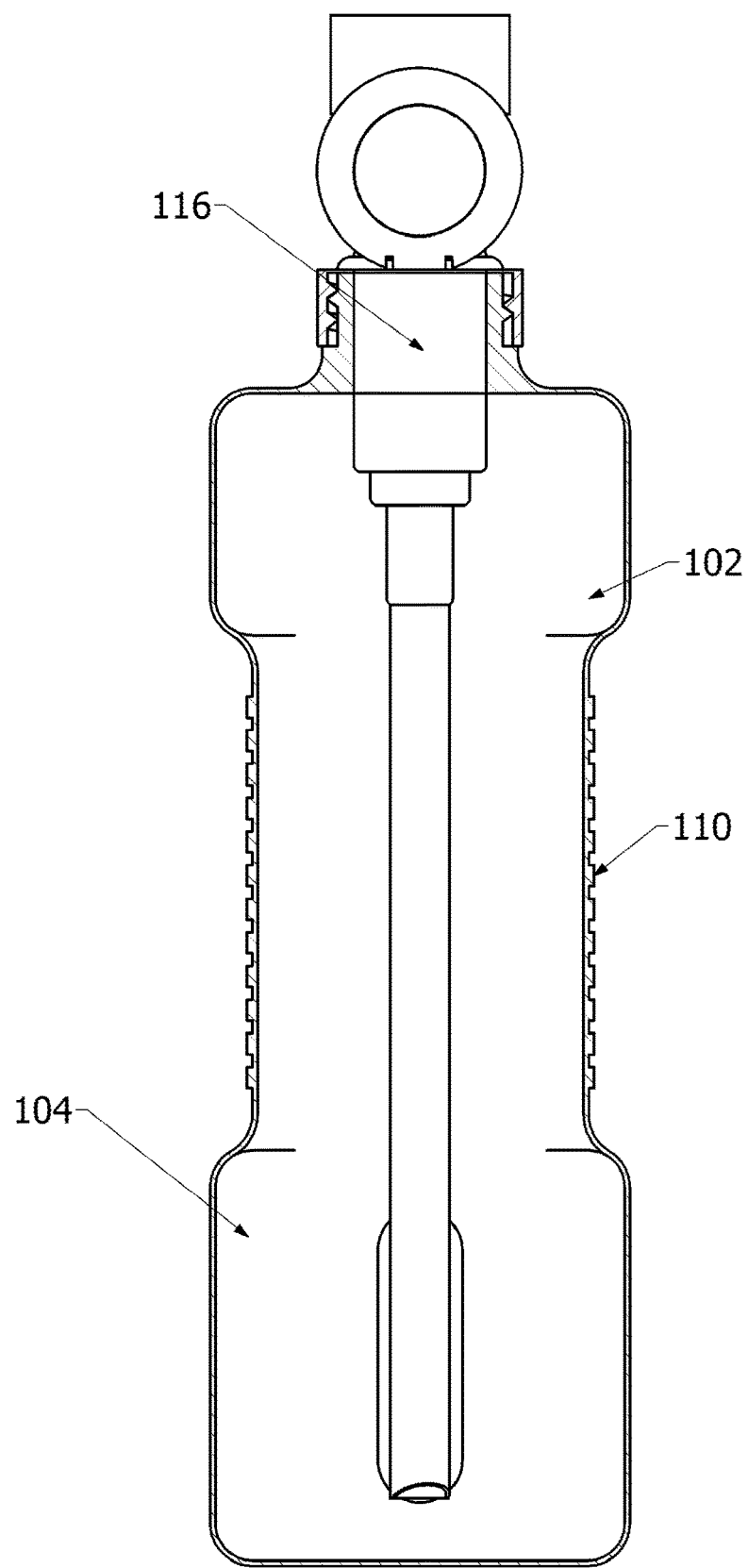
FIG. 4A illustrates a cross-sectional side view of the bottle apparatus, in accordance with one or more embodiments of the present disclosure.
Figure 4B:
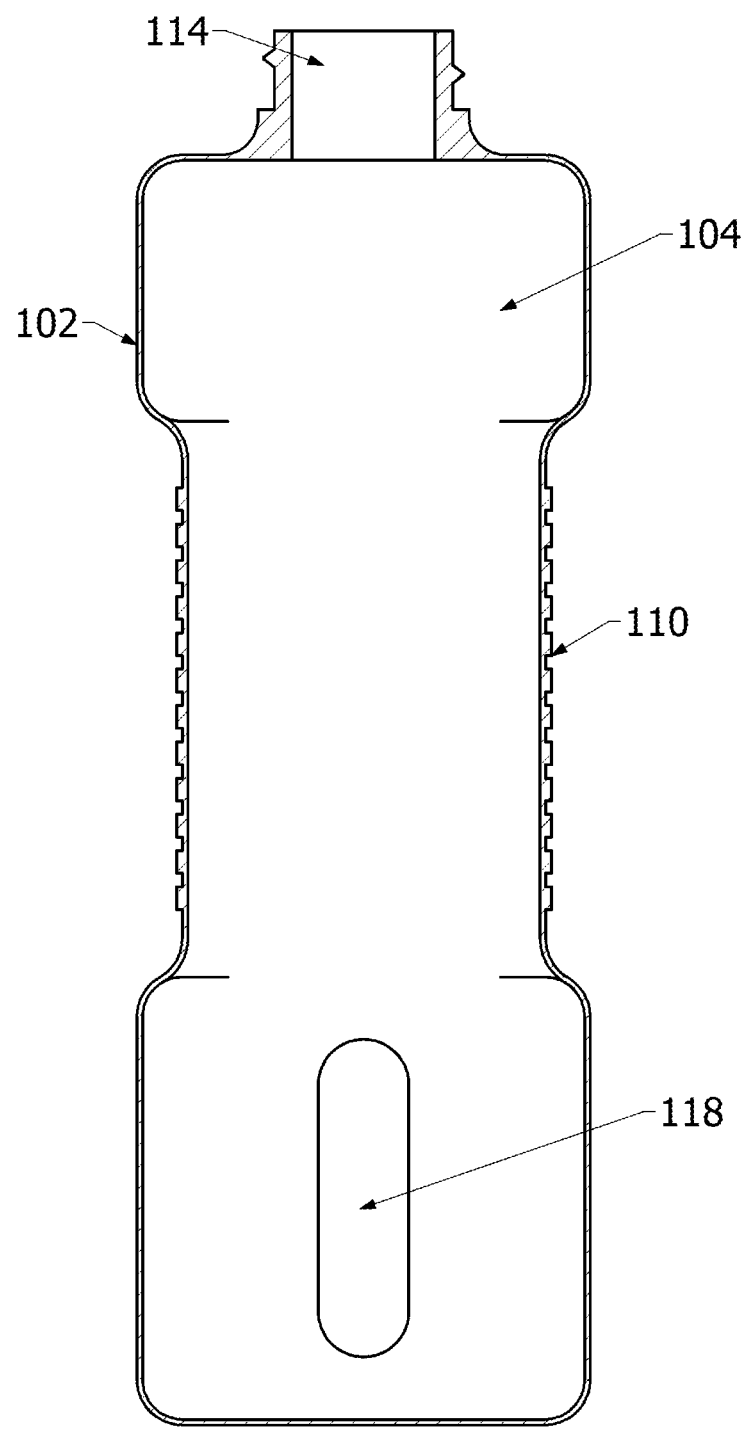
FIG. 4B illustrates an additional cross-sectional side view of the bottle apparatus, in accordance with one or more embodiments of the present disclosure.

FIGS. 1A-4B generally illustrate a bottle apparatus 100, in accordance with one or more embodiments of the present disclosure. In particular, FIGS. 1A-1B illustrate front views of a bottle apparatus 100, in accordance with one or more embodiments of the present disclosure. In particular, FIG. 2A illustrates a front cross-sectional view of the bottle apparatus 100, while FIG. 2B illustrates a rear cross-sectional view of the bottle apparatus 100, in accordance with one or more embodiments of the present disclosure. In particular, FIGS. 3A-3B illustrate side views of the bottle apparatus 100, in accordance with one or more embodiments of the present disclosure. In particular, FIGS. 4A-4B illustrate cross-sectional side views of the bottle apparatus 100, in accordance with one or more embodiments of the present disclosure.

In embodiments, the bottle apparatus 100 includes a body 102. The body 102 may include a plurality of sidewalls 104. The body 102 may further include a top wall 106 and a bottom wall 108. For example, the body 102 may include four sidewalls 104. In some embodiments, a sidewall of the plurality of sidewalls 104 may include one or more grooves 110 configured to provide a non-slip grip. For example, the sidewall of the plurality of sidewalls 104 may include one or more horizontal grooves 110. By way of another embodiment, the sidewall of the plurality of sidewalls may include one or more vertical grooves. By way of another embodiment, the sidewall of the plurality of sidewalls 104 may include a combination of one or more horizontal grooves and one or more vertical grooves. It is noted herein that any number of sidewalls 104 may include one or more grooves 110. For example, the four sidewalls 104 may include one or more grooves 110. For instance, as shown in FIG. 1A, the one or more grooves 110 may be intermittent (e.g., separated). In another instance, the one or more grooves 110 may be continuous. By way of another example, a front sidewall and a rear sidewall may include one or more grooves 110. By way of another example, a left sidewall and a right sidewall may include one or more grooves 110.

In some embodiments, although not shown, a sidewall of the plurality of sidewalls 104 may include one or more grip bands. The one or more grip bands may be configured to provide a user with a non-slip grip, such that the user may easily grasp the bottle apparatus 100.

Figure 2A:
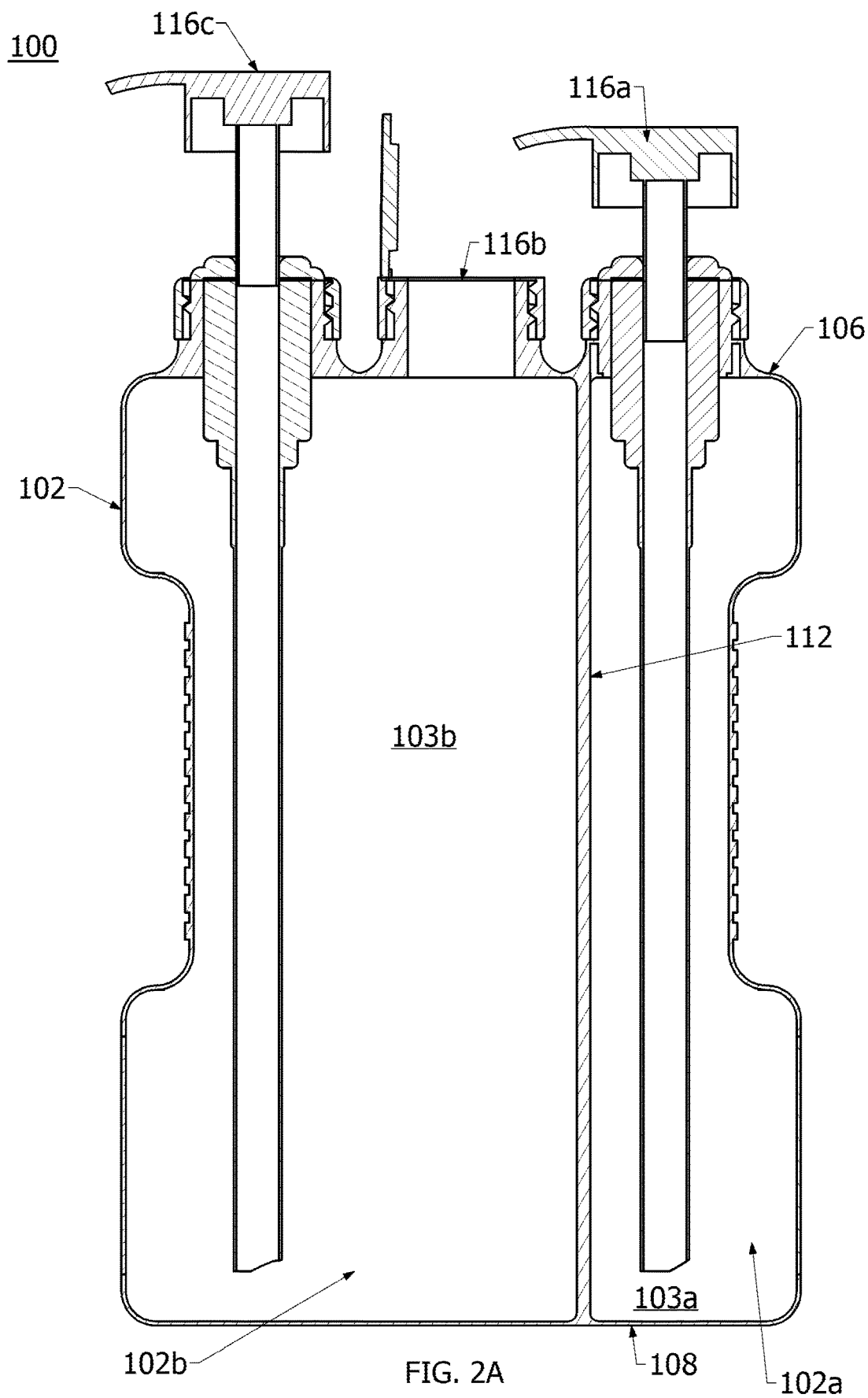
FIG. 2A illustrates a cross-sectional front view of the bottle apparatus, in accordance with one or more embodiments of the present disclosure.
Figure 2B:
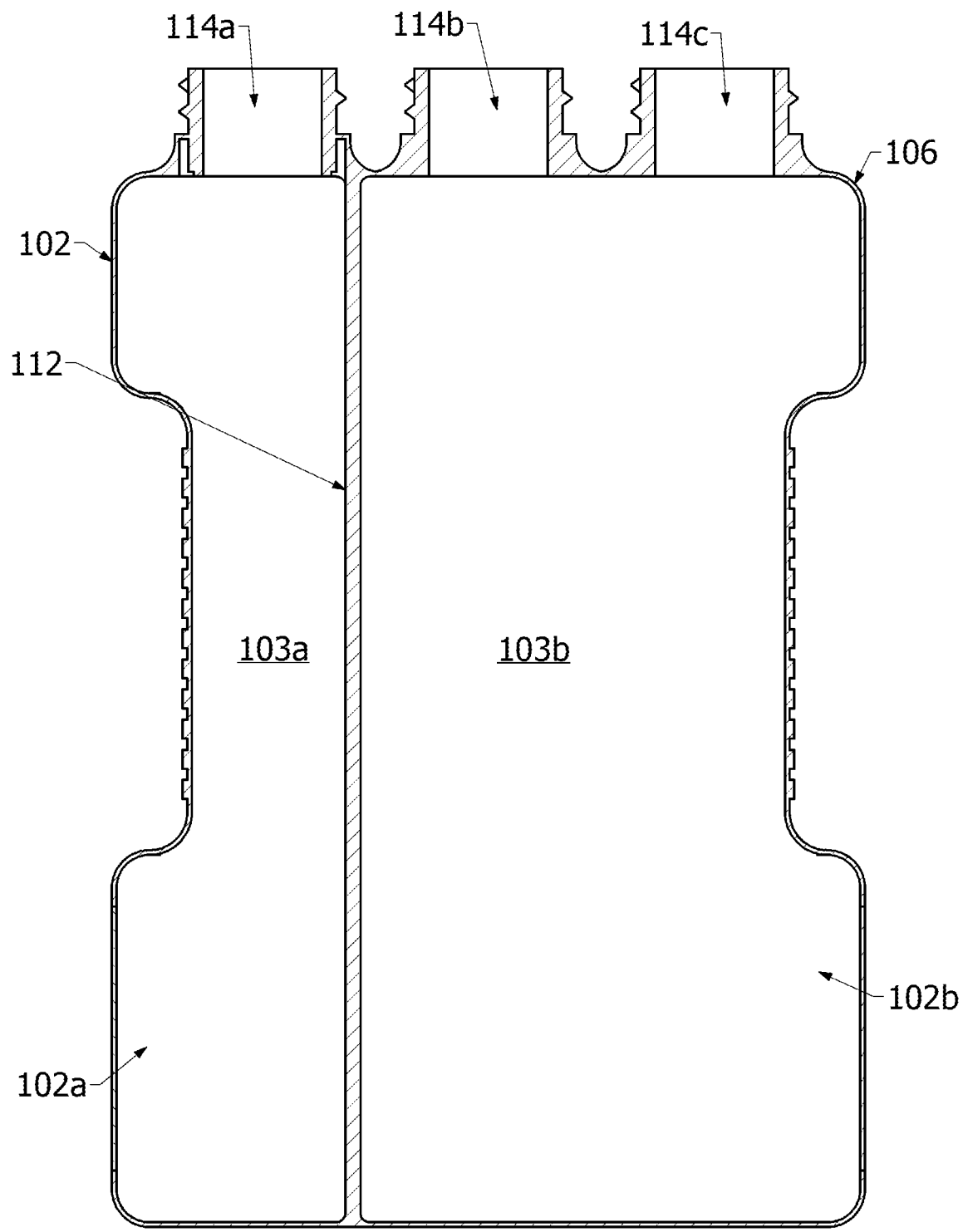
FIG. 2B illustrates an additional cross-sectional rear view of the bottle apparatus, in accordance with one or more embodiments of the present disclosure.
Figure 3A:
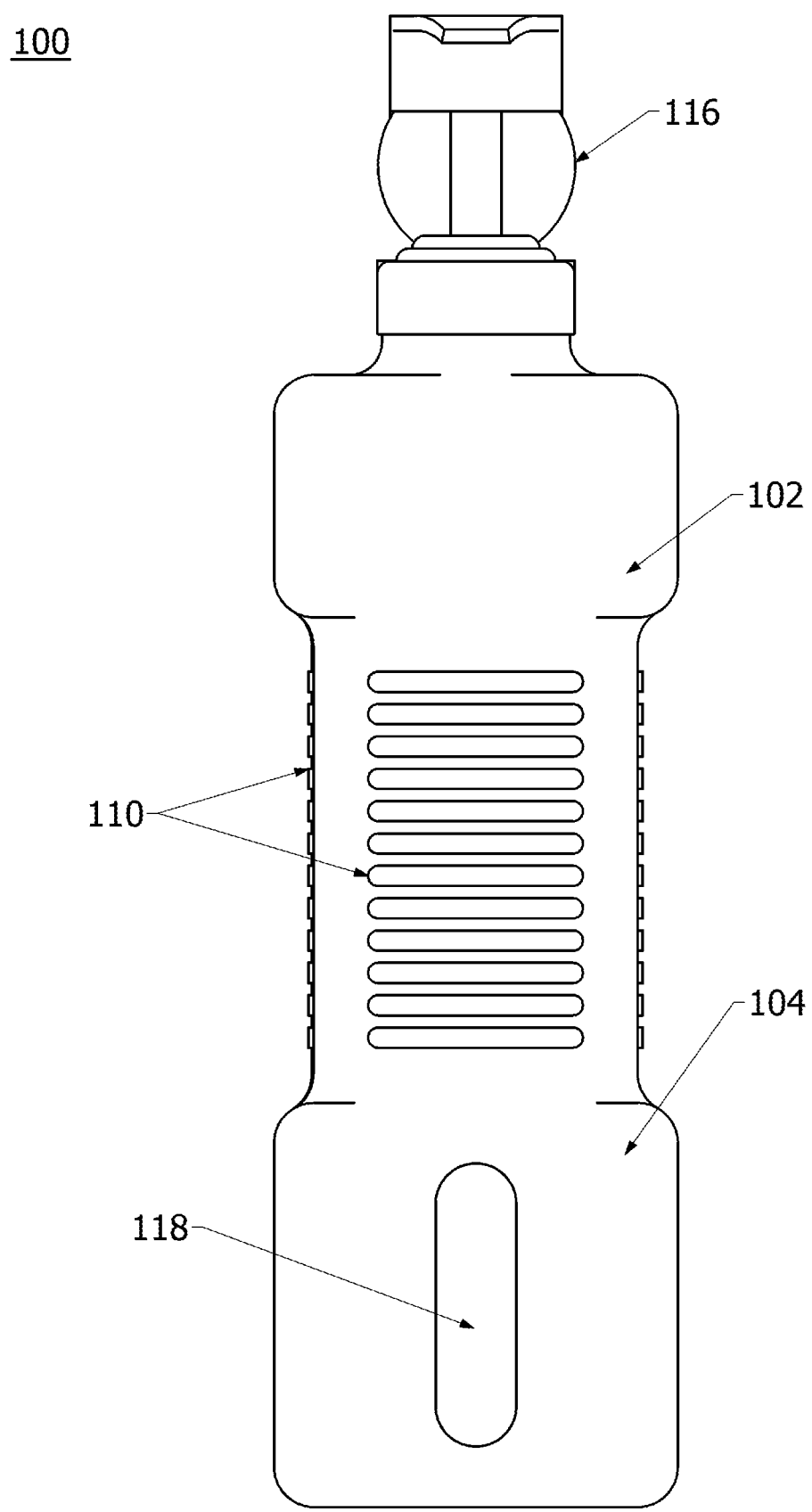
FIG. 3A illustrates a side view of the bottle apparatus, in accordance with one or more embodiments of the present disclosure.
Figure 3B:
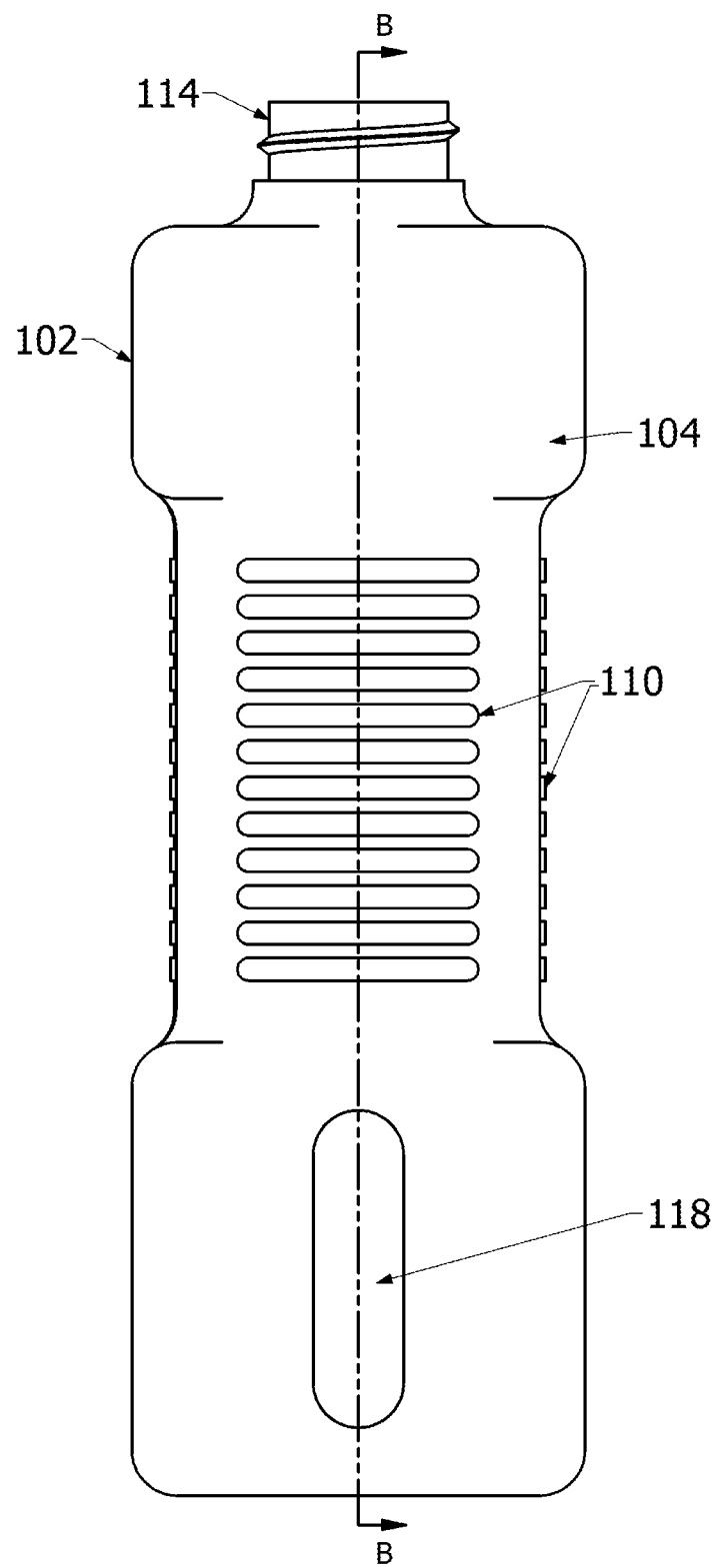
FIG. 3B illustrates an additional first side view of the bottle apparatus, in accordance with one or more embodiments of the present disclosure.

Referring to FIGS. 2A and 2B, in embodiments, the body 102 includes a first body 102a and an additional body 102b. For example, one or more dividing members 112 may form at least a portion of the first body 102a and form at least a portion of the additional body 102b. It is noted herein that although FIGS. 2A-2B illustrate the one or more dividing members 112 extending along the full length of the body, the one or more dividing members 112 may be any size (e.g., length) or thickness. For example, one or more dividing members 112 may extend between an interior surface of a top wall of the body, or bottle apparatus 100, to an interior surface of the bottom wall of the body, or the bottle apparatus 100.

The first body 102a may include a cavity 103a. The cavity 103a may be defined by an interior surface of the first body 102a and a first surface (e.g. a first side) of the one or more dividing members 112. For example, the cavity 103a may be defined by the right sidewall 104, the bottom wall 108, the top wall 106, and the first surface or first side of the one or more dividing members 112. The additional body 102b may include a cavity 103b. The cavity 103b may be defined by an interior surface of the additional body 102b and a second surface (e.g. a second side) of the one or more dividing members 112. For example, the cavity 103b may be defined by the left sidewall 104, the bottom wall 108, the top wall 106, and the second surface or second side of the one or more dividing members 112.

In embodiments, the body 102 is configured to hold a plurality of products. For example, the body 102 may be configured to hold a plurality of products with different concentration levels. For instance, the cavity 103a of the first body 102a may be configured to hold a first product. In this regard, the cavity 103a of the first body 102a may be configured to hold a concentrated product. In another instance, the cavity of the additional body 102b may be configured to hold an additional product. In this regard, the cavity of the additional body 102b may be configured to hold a diluted product (e.g., the concentrated product and a diluent). The formation of the diluted product will be discussed further herein.

It is noted herein that the body 102 may be any shape known in the art suitable for holding at least one of the concentrated product, the diluted product, or the diluent. For example, as shown in FIG. 1A, the body 102 may be a hollow rectangle with curved corners. For instance, the left sidewall and the right sidewall may be tapered such that the tapered sidewall may conform to a hand of a user. It is further contemplated that body 102 may be a generally cylindrical shape, or a generally spherical shape whereby one or more walls (e.g., one or more sidewalls 104, top wall 106, or bottom wall 108) may refer to a portion of the generally cylindrical shape or generally spherical shape. For example, the one or more walls of the cylindrical or spherical shaped body 102 may form a single surface. For instance, at least one of the one or more sidewalls 104, the top wall 106, or the bottom wall 108 may form a single surface of the body 102. In this regard, the one or more walls may be continuous whereby the one or more walls are curved (or substantially curved) and form the outer surface of the spherical or cylindrical body 102.

It is further contemplated that the body 102 may include a neck (not shown). For example, the body 102 may include a tapered neck. In this regard, the top wall 106 of the body 102 may include a tapered neck, such that an opening of the plurality of openings may be coupled to a portion of the tapered neck on the top wall 106 of the body 102.

For purposes of the present disclosure, the term "concentrated product" refers to a product with a higher concentration level relative to a diluted product. Further, the term "diluted product" refers to a product with a lower concentration level relative to a concentrated product. Further, the term "concentration" refers to a measure of the amount of solute that has been dissolved in a given amount of solvent or solution. For example, a concentrated product has a relatively large amount of dissolved solute, while a diluted product has a relatively small amount of dissolved solute. Further, the terms "diluted product" and "concentrated product with diluent" may be used interchangeably throughout the present disclosure.

It is noted herein that the first product and/or the additional product may include any concentrated and/or diluted product known in the art. For example, the first product and/or additional product may include any health and beauty product known in the art including, but not limited to, shampoo, conditioner, body wash, or the like. By way of another example, the first product and/or additional product may be any cleaning product known in art including, but not limited to, floor cleaner, countertop cleaner, bathtub and/or shower cleaner, or the like. By way of a further example, the first product and/or additional product may be any industrial product known in the art including, but not limited to, detergent, ammonia, isopropyl alcohol, calcium hypochlorite (powered bleach), sodium hypochlorite (liquid bleach), sodium hydroxide (lye), acetic acid (vinegar), or the like. By way of a further example, the first product and/or additional product may be any lawn and garden products known in the art including, but not limited to, pesticides, fertilizer, weed killers, or the like. By way of a further example, the first product and/or additional product may be any farming and/or agriculture products known in the art including, but not limited to, pesticides, fertilizer, weed killers, or the like. By way of a further example, the first product and/or additional product may be culinary and/or food service products including, but not limited to, condiments, beverages, or the like.

Further, it is noted herein that the diluent may include any diluent known in the art including, but not limited to, water, alcohol (e.g., ethanol, propanol, or the like), ketone (e.g., acetone), or the like.

In embodiments, the bottle apparatus 100 includes a plurality of openings 114. For example, the plurality of openings 114 may be arranged on the top wall 106 of the body 102. The bottle apparatus 100 may include any number of openings. For example, as shown in FIG. 2B, the first body 102a may include a first opening 114a. By way of another example, as shown in FIG. 2B, the additional body 102b may include a second opening 114b. By way of a further example, as shown in FIG. 2B, the additional body 102*b* may further include a third opening 114*c*. The first opening 114*a* of the first body 102*a* may be configured to receive a first product. For example, the first opening 114*a* may be configured to receive a concentrated product, such that the first body 102*a* contains the concentrated product. The second opening 114*b* may configured to receive a second product. For example, the second opening 114*b* may be configured to receive at least one of a diluent or a concentrated product. For instance, the second opening may be configured to receive the concentrated product and the diluent, such that the additional body 102*b* may contain a diluted product (e.g., the diluent and the concentrated product). The third opening 114*c* may be configured to couple to a transfer member 116*c* to dispense the diluted product contained within the additional body 102*b*. It is noted herein that the second opening 114*b* may be configured to couple to a transfer member 116 configured to dispense the diluted product within the additional body 102*b*. Further, it is noted herein that the third opening 114*c* may be configured to receive at least one of the diluent or the concentrated product to form the diluted product within the additional body 102*b*. Therefore, the above discussion should not be construed as a limitation on the scope of the present disclosure.

In embodiments, the bottle apparatus 100 includes one or more transfer members 116 configured to couple to a portion of the plurality of openings 114. FIGS. 15A-15F illustrate exemplary transfer members 116, 518, in accordance with one or more embodiments of the present disclosure. It is noted herein that the bottle apparatus 100 may include any number and type of transfer member 116, 518 known in the art suitable for transferring one or more products (e.g., liquids, gels, or the like) including, but not limited to, one or more caps (e.g., flip caps, screw caps, snap on caps, or the like), one or more spray dispensers (e.g., actuated spray dispensers, spray dispensers with hoses, or the like), one or more pumps (e.g., standard pumps, foam pumps, or the like), one or more plugs, one or more pressure sprayers, or the like.

For example, as shown in FIG. 1A, the one or more transfer members 116 may include one or more pumps. For instance, a first pump may be configured to couple to the first opening 114*a*, such that the first pump is configured to dispense the concentrated product contained within the first body 102*a*. In another instance, a second pump may be configured to couple to the third opening 114*c*, such that the second pump is configured to dispense the diluted product contained within the additional body 102*b*. By way of another example, as shown in FIG. 1A, the bottle apparatus 100 may include one or more caps (e.g., flip caps). For instance, a cap may be configured to couple to the second opening 114*b*, such that the cap is configured to allow a user to transfer a diluent into the additional body 102*b* via the second opening 114*b*. In this regard, a user may be able to mix the diluent and the concentrated to form the diluted product within the cavity of the additional body 102*b*. It is noted herein that the use of a cap allows a user to mix (e.g., shake, invert, or the like) the contents of the bottle apparatus 100 without one or more of the products leaking out of the plurality of openings 114 and/or one or more transfer members 116.

By way of a further example, the one or more transfer members 116 may include one or more foam pump dispensers. By way of a further example, the one or more transfer members 116 may be a screw cap. By way of another example, the one or more transfer members 116 may be a plug dispenser. By way of an additional example, the one or more transfer members 116 may be a spray dispenser. By way of a further example, the one or more transfer members 116 may be a spray dispenser coupled to an extendable hose.

The one or more transfer members 116 may couple to the plurality of openings 114 via any mechanism known in the art. For example, in some embodiments, the plurality of openings 114 may include one or more threaded portions configured to couple to one or more threaded portions of the one or more transfer members 116. By way of another example, in some embodiments, the plurality of openings 114 may include one or more non-threaded portions.

In some embodiments, the bottle apparatus 100 further includes one or more transparent windows 118 configured to allow a user to see the amount of the product within the body 102. For example, the first body 102*a* may include one or more transparent windows 118 configured to allow a user to see the amount of concentrated product within the cavity of the first body 102*a*. By way of another example, the additional body 102*b* may include one or more transparent windows 118 configured to allow a user to see the amount of diluted product within the cavity of the additional body 102*b*.

The one or more transparent windows 118 may include one or more measurement markers configured to allow a user to measure the amount of product within the body 102. For example, the one or more measurement markers may be configured to allow a user to quantify the amount of concentrated product within the cavity of the first body 102*a*. By way of another example, the one or more measurement markers may be configured to allow a user to quantify the amount of diluted product within the cavity of the additional body 102*b*. It is noted herein that the measurement markers on the transparent window 118 may include any measurement system known in the art suitable for measuring liquids or gels. For example, the measurement markers may include, but are not limited to, ounces, pints, quarts, cups, or the like.

Figure 5:
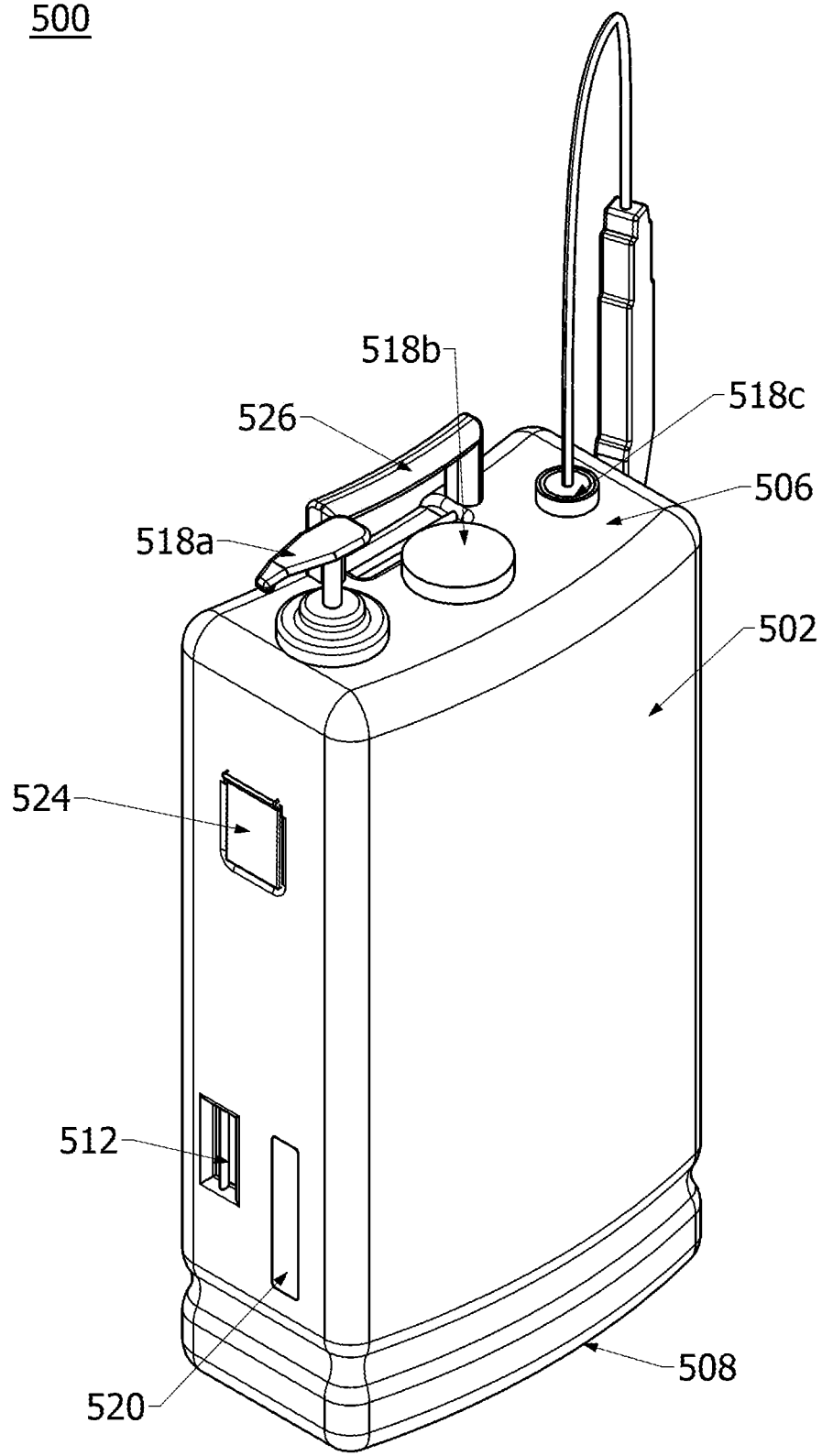
FIG. 5 illustrates a front perspective view of a bottle apparatus, in accordance with one or more embodiments of the present disclosure.
Figure 6A:
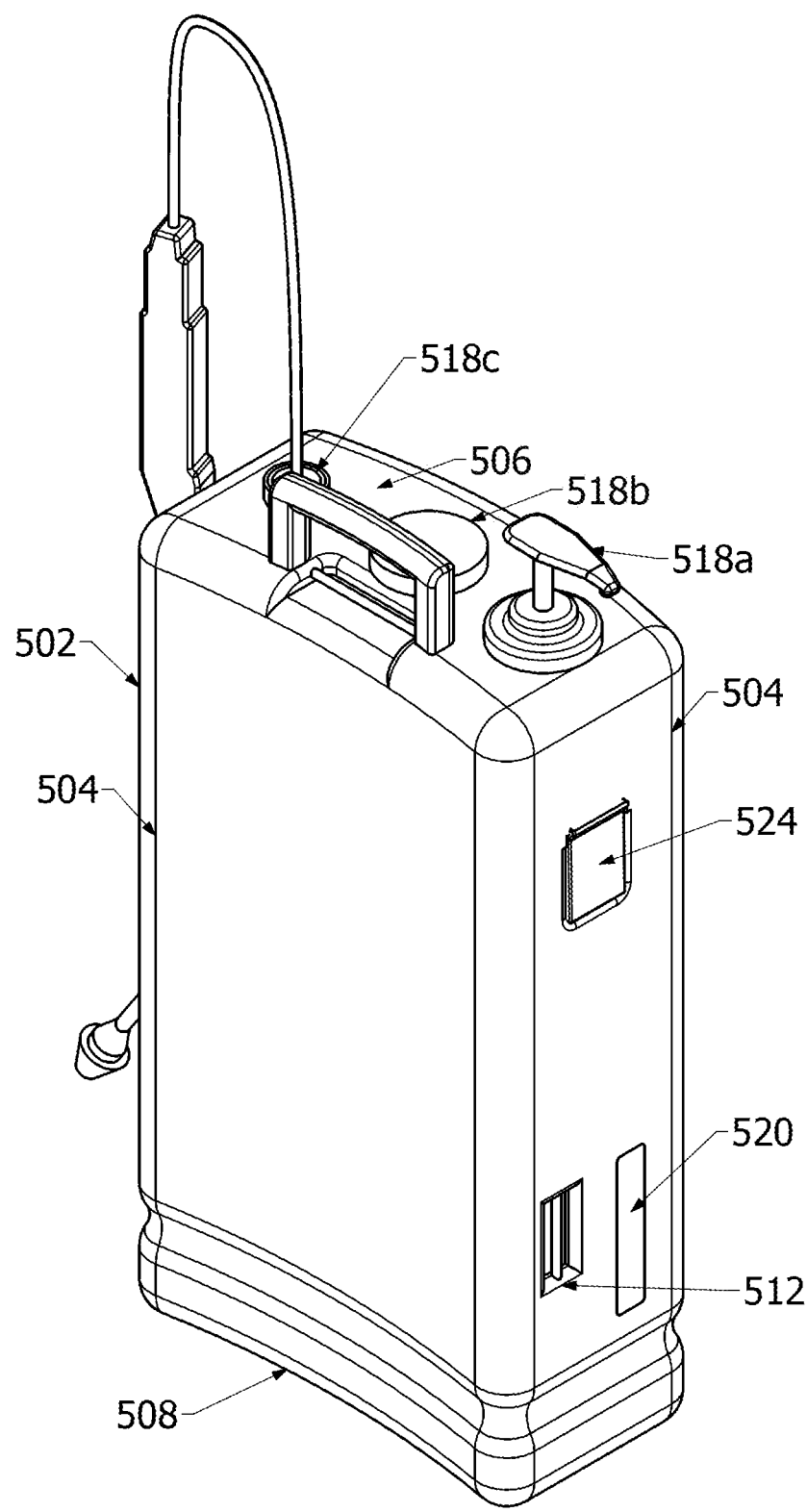
FIG. 6A illustrates a rear perspective view of the bottle apparatus, in accordance with one or more embodiments of the present disclosure.
Figure 6B:
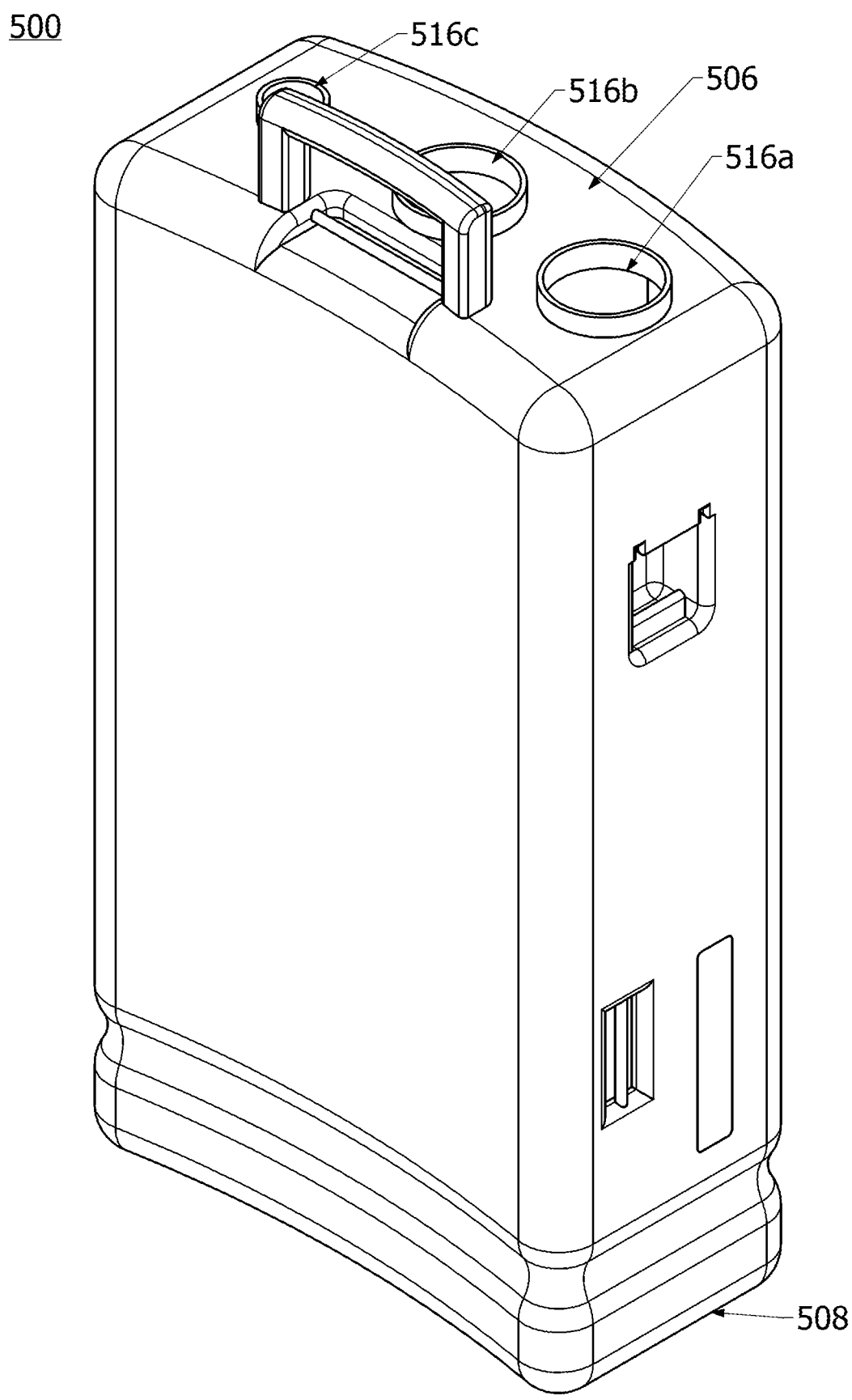
FIG. 6B illustrates a rear perspective view of the bottle apparatus, in accordance with one or more embodiments of the present disclosure.
Figure 7:
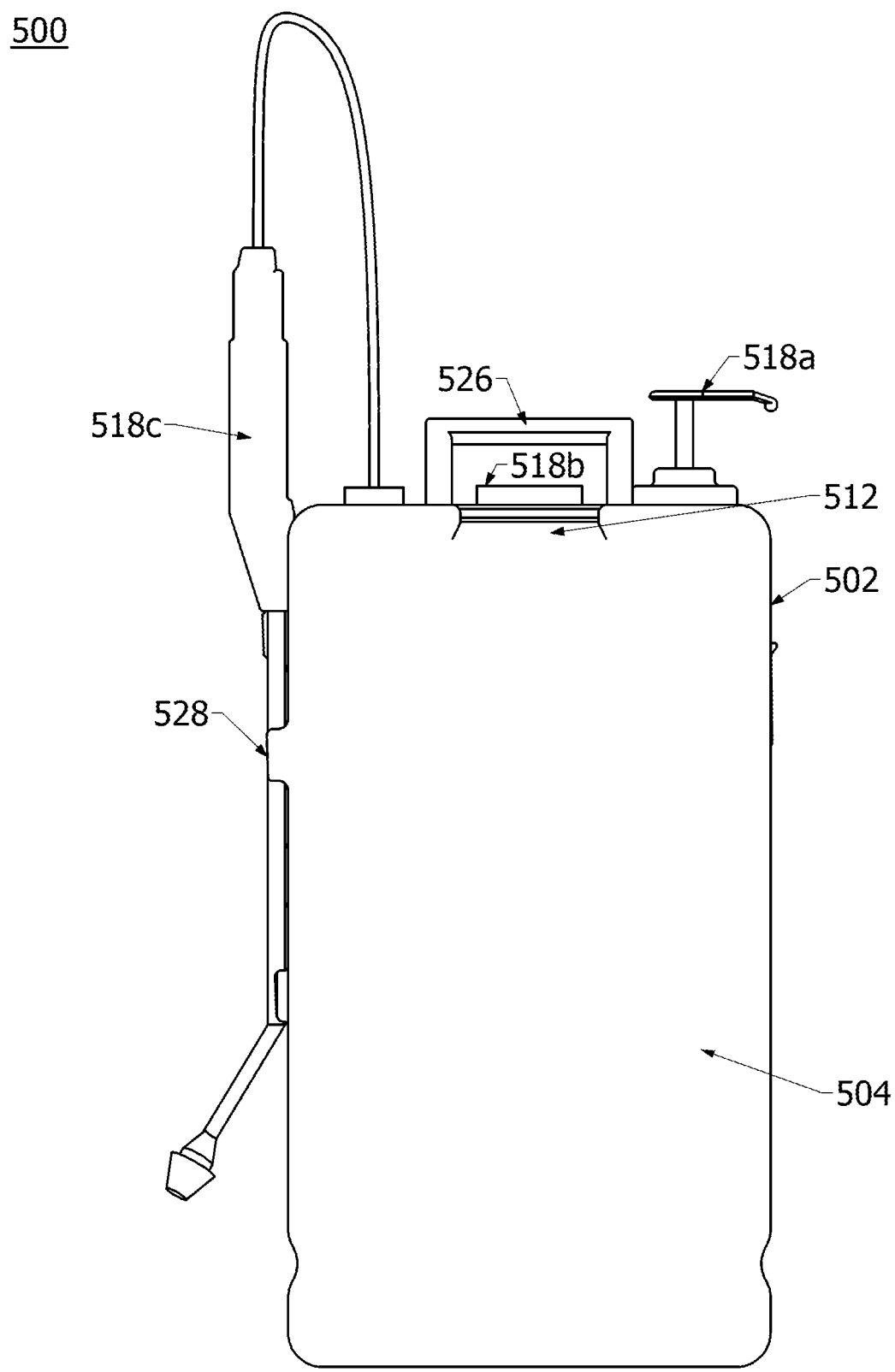
FIG. 7 illustrates a rear view of the bottle apparatus, in accordance with one or more embodiments of the present disclosure.
Figure 8:
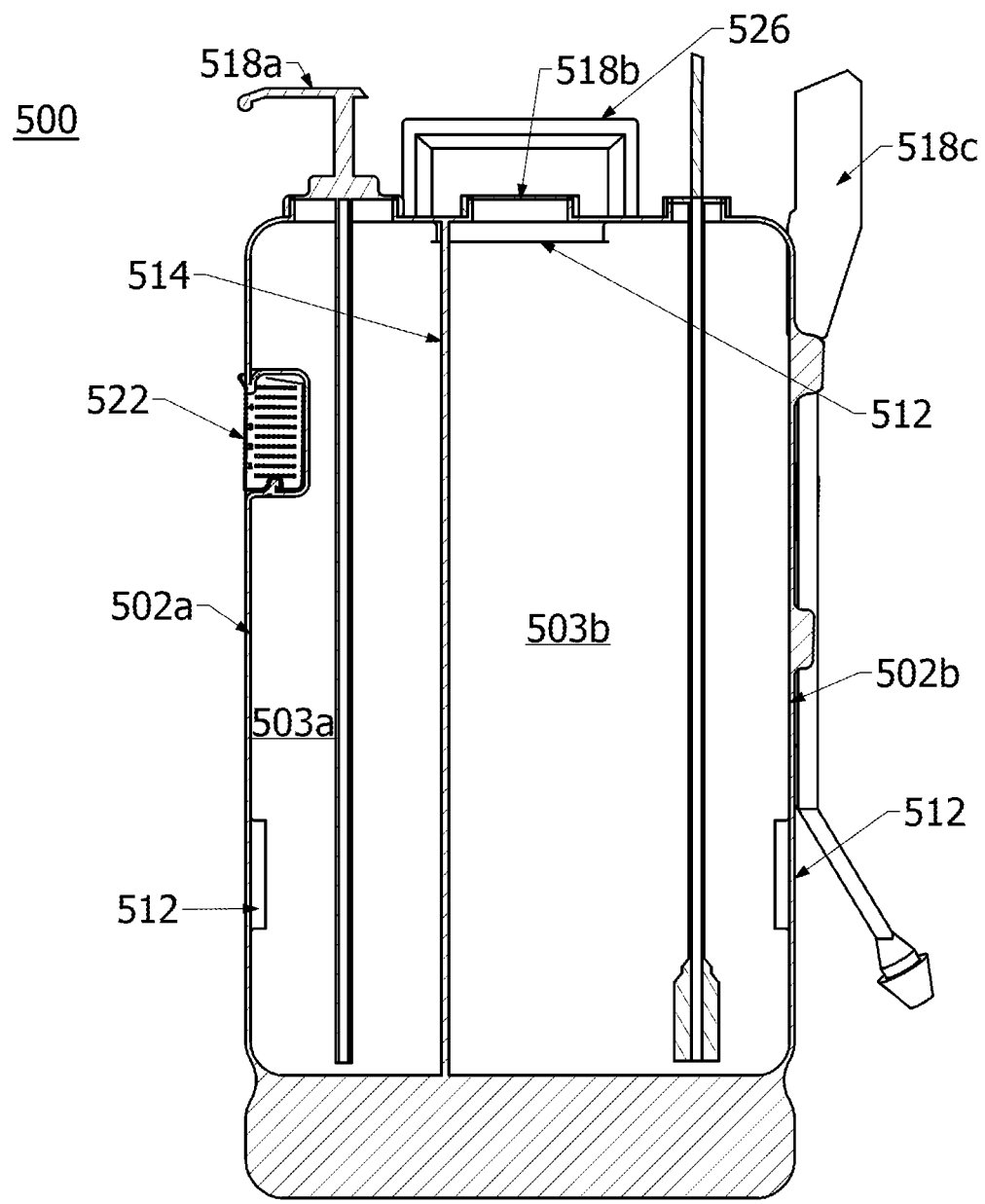
FIG. 8 illustrates a cross-sectional front view of the bottle apparatus, in accordance with one or more embodiments of the present disclosure.
Figure 9:
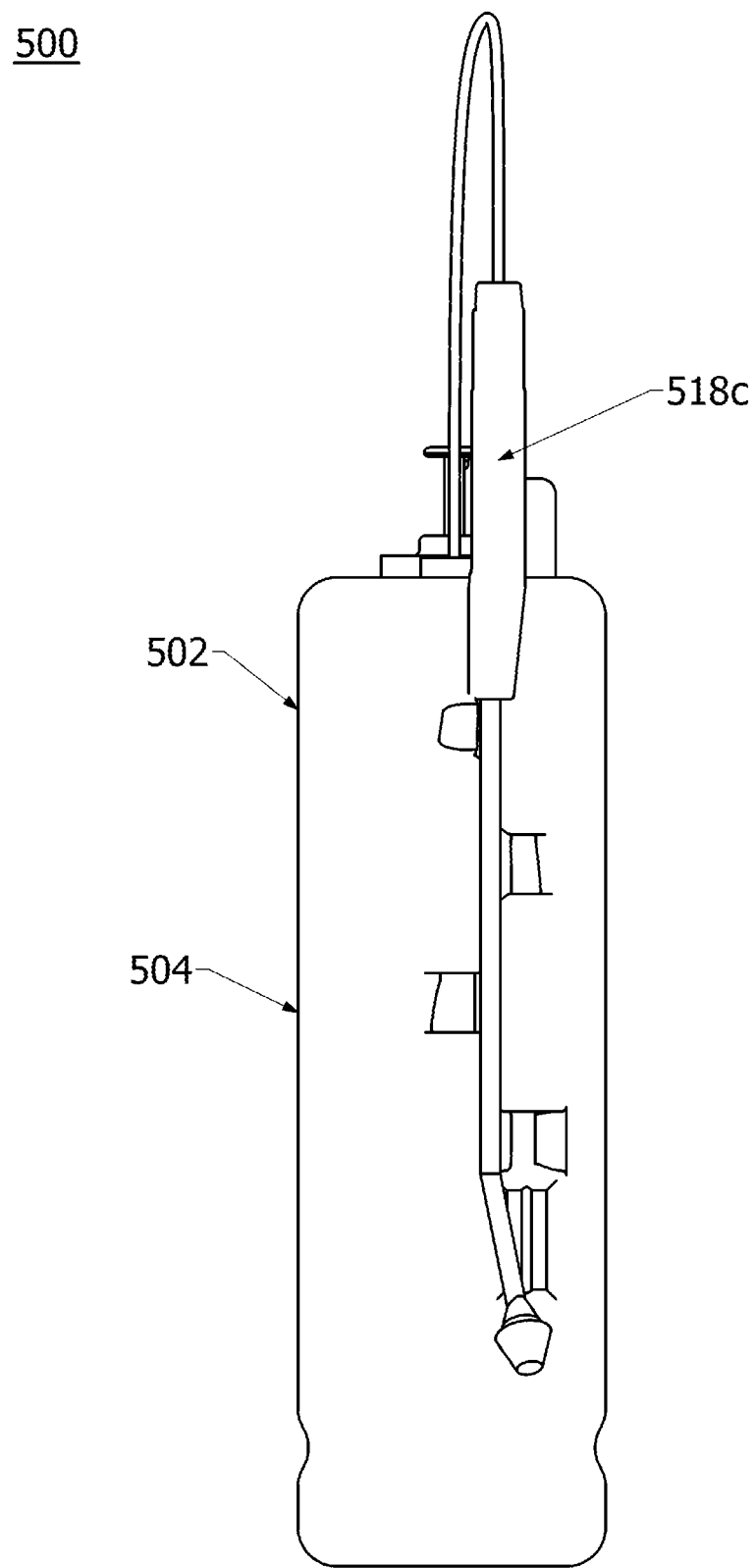
FIG. 9 illustrates a first side view of the bottle apparatus, in accordance with one or more embodiments of the present disclosure.
Figure 10:
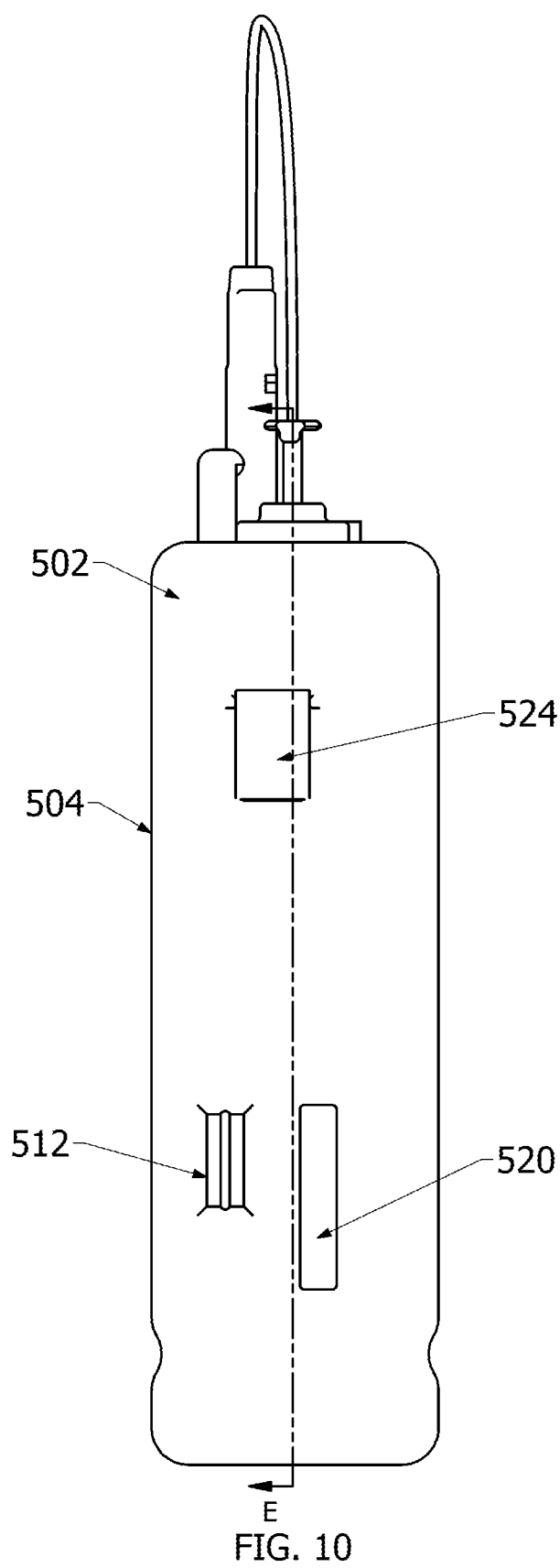
FIG. 10 illustrates a second side view of the bottle apparatus, in accordance with one or more embodiments of the present disclosure.
Figure 11A:
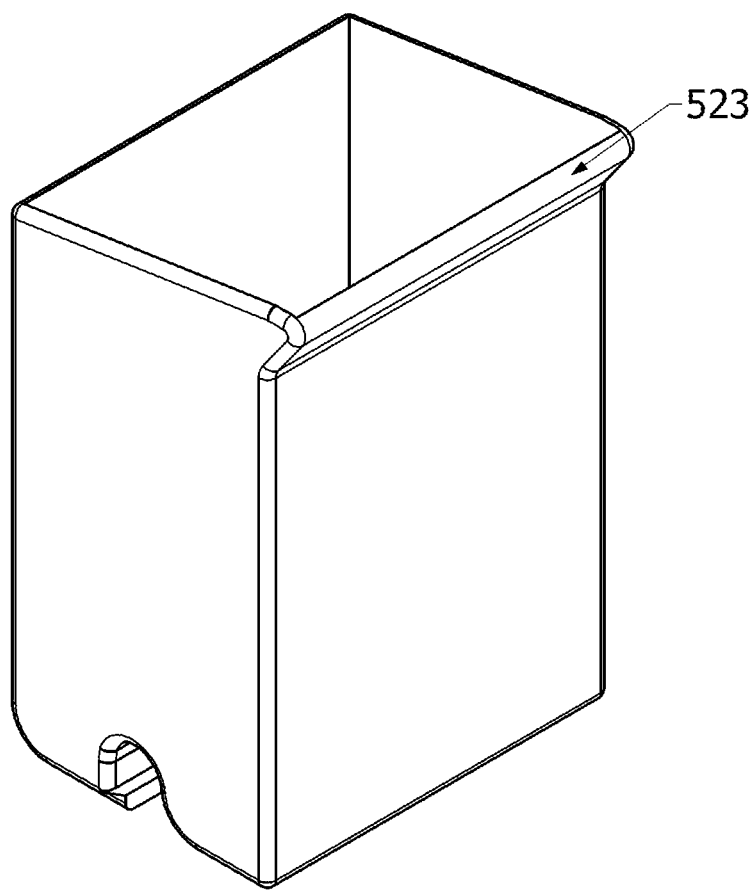
FIG. 11A illustrates a measuring container of the bottle apparatus, in accordance with one or more embodiments of the present disclosure.
Figure 11B:
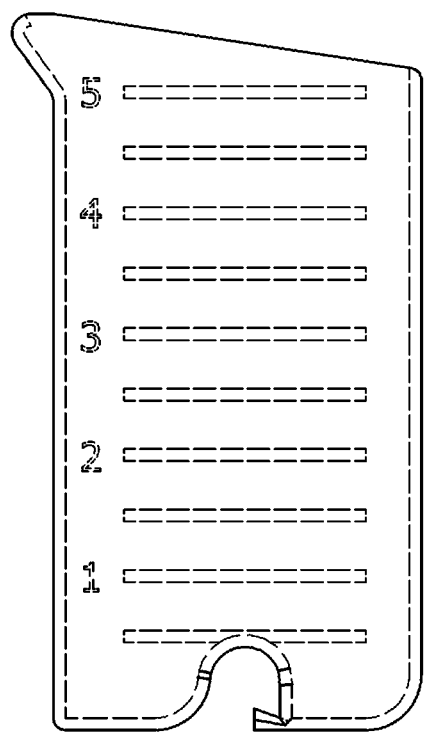
FIG. 11B illustrates the measuring container of the bottle apparatus, in accordance with one or more embodiments of the present disclosure.
Figure 12:
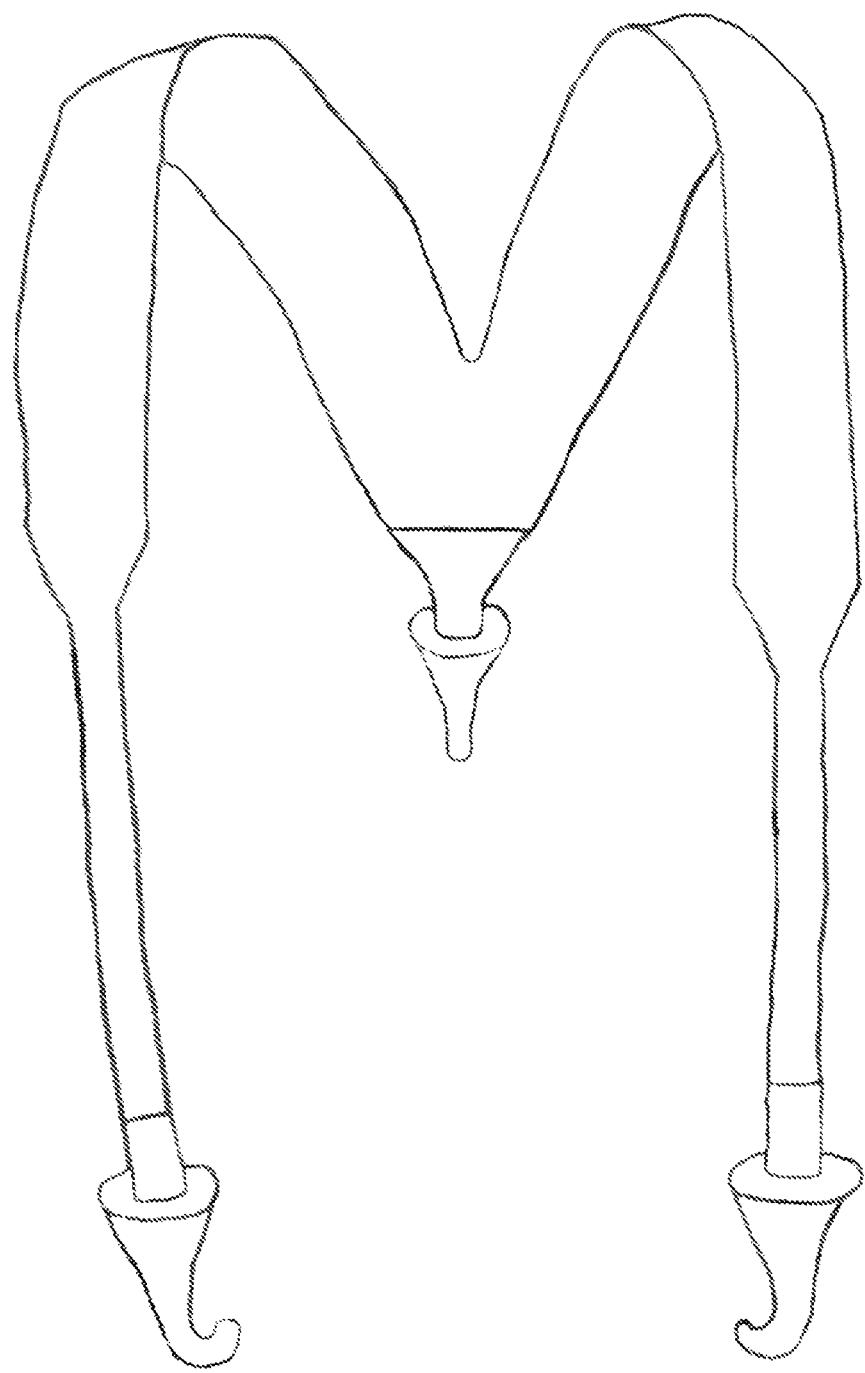
FIG. 12 illustrates straps of the bottle apparatus, in accordance with one or more embodiments of the present disclosure.
Figure 13A:
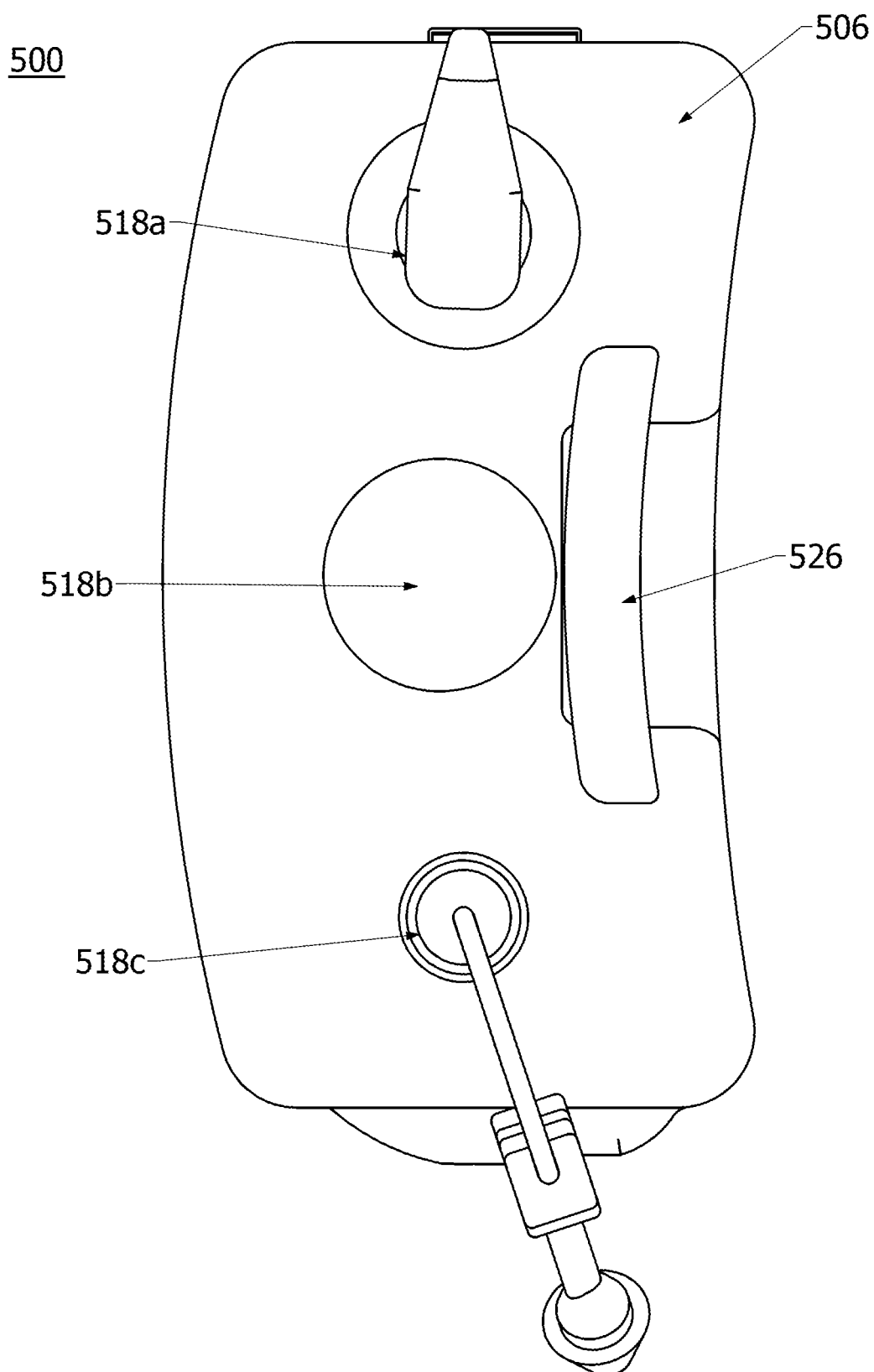
FIG. 13A illustrates a top view of the bottle apparatus, in accordance with one or more embodiments of the present disclosure.
Figure 13B:
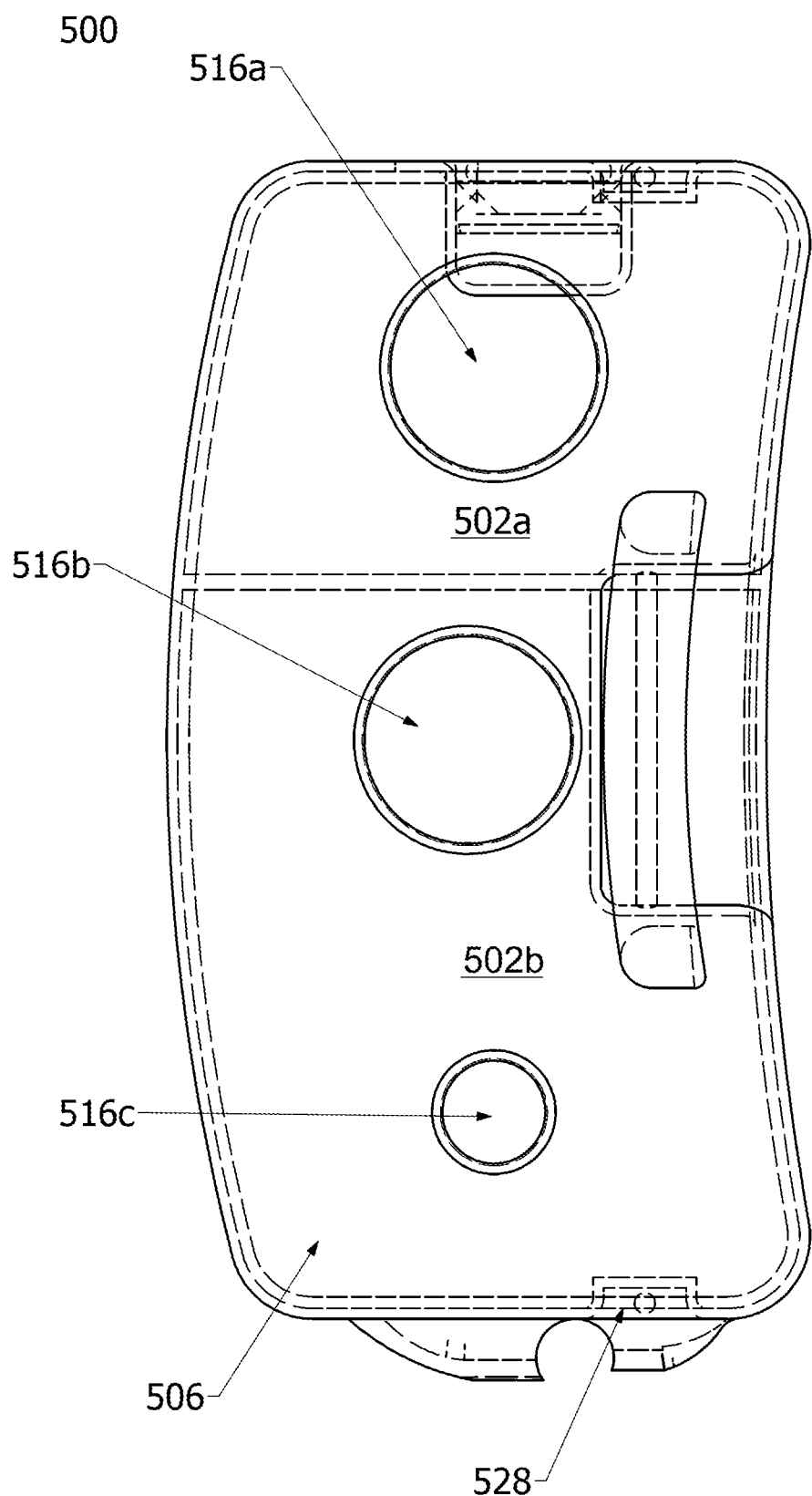
FIG. 13B illustrates a top view of the bottle apparatus, in accordance with one or more embodiments of the present disclosure.
Figure 14:
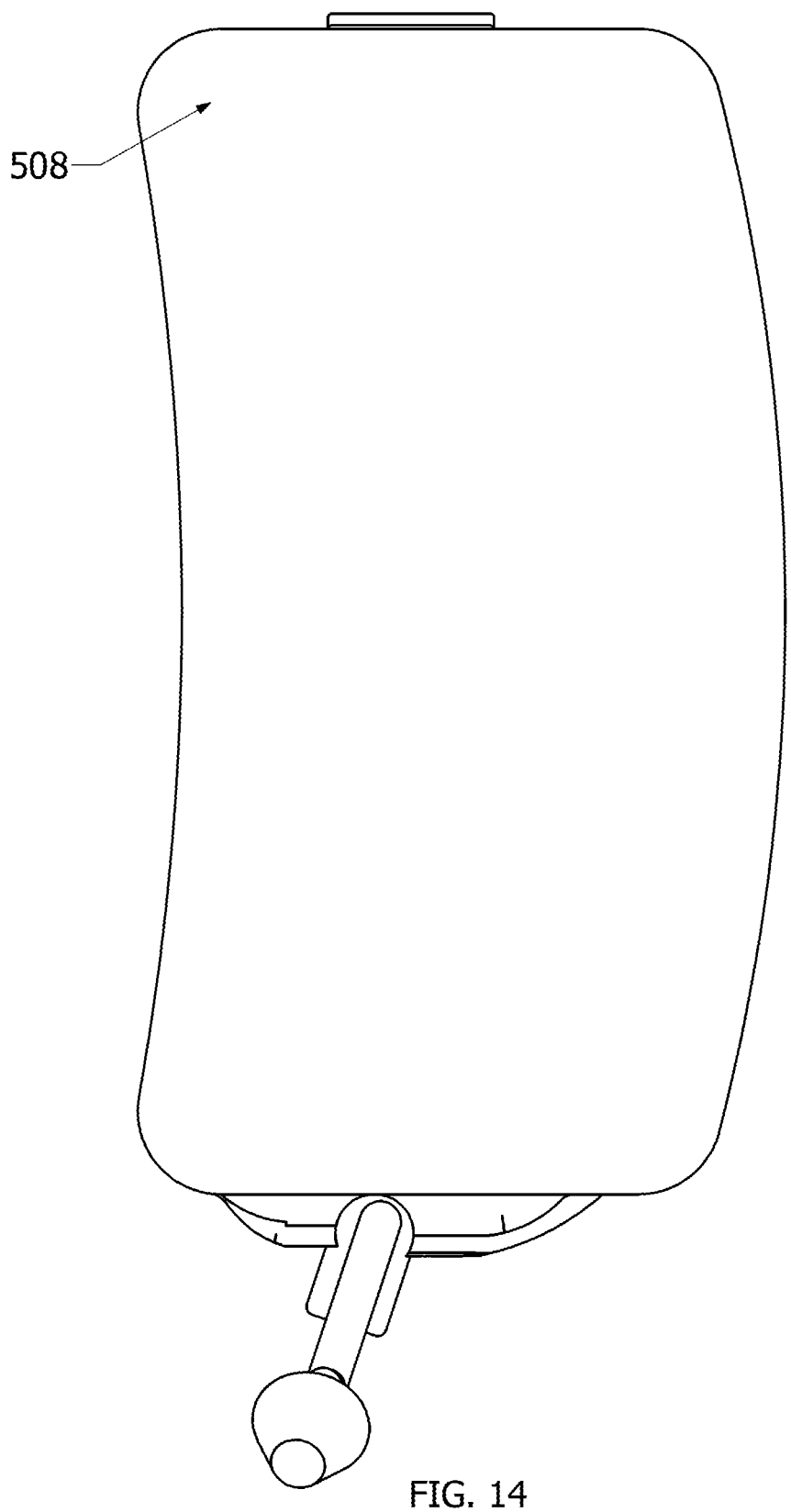
FIG. 14 illustrates a bottom view of the bottle apparatus, in accordance with one or more embodiments of the present disclosure.
Figure 15C:
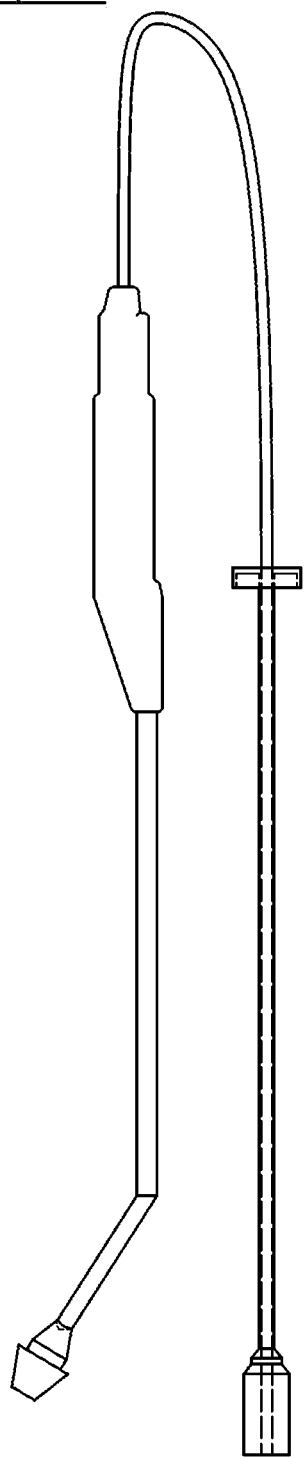
FIG. 15C illustrates a transferring member of the bottle apparatus, in accordance with one or more embodiments of the present disclosure.
Figure 15D:
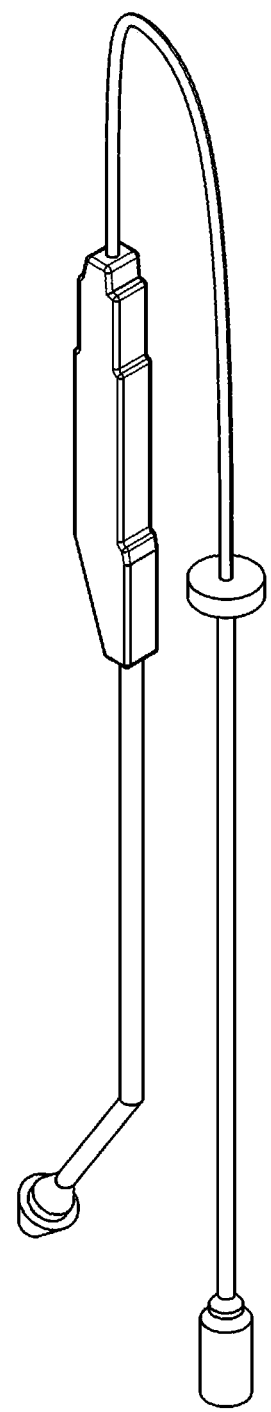
FIG. 15D illustrates a transferring member of the bottle apparatus, in accordance with one or more embodiments of the present disclosure.
Figure 15E:
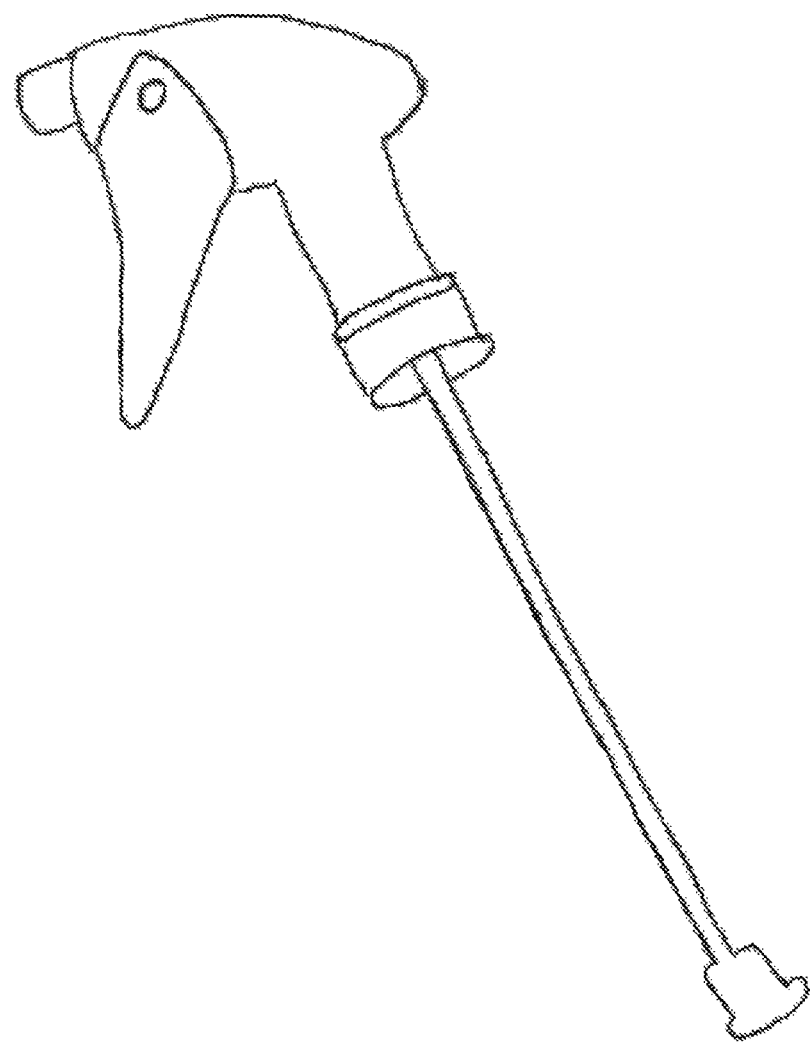
FIG. 15E illustrates a transferring member of the bottle apparatus, in accordance with one or more embodiments of the present disclosure.
Figure 15F:
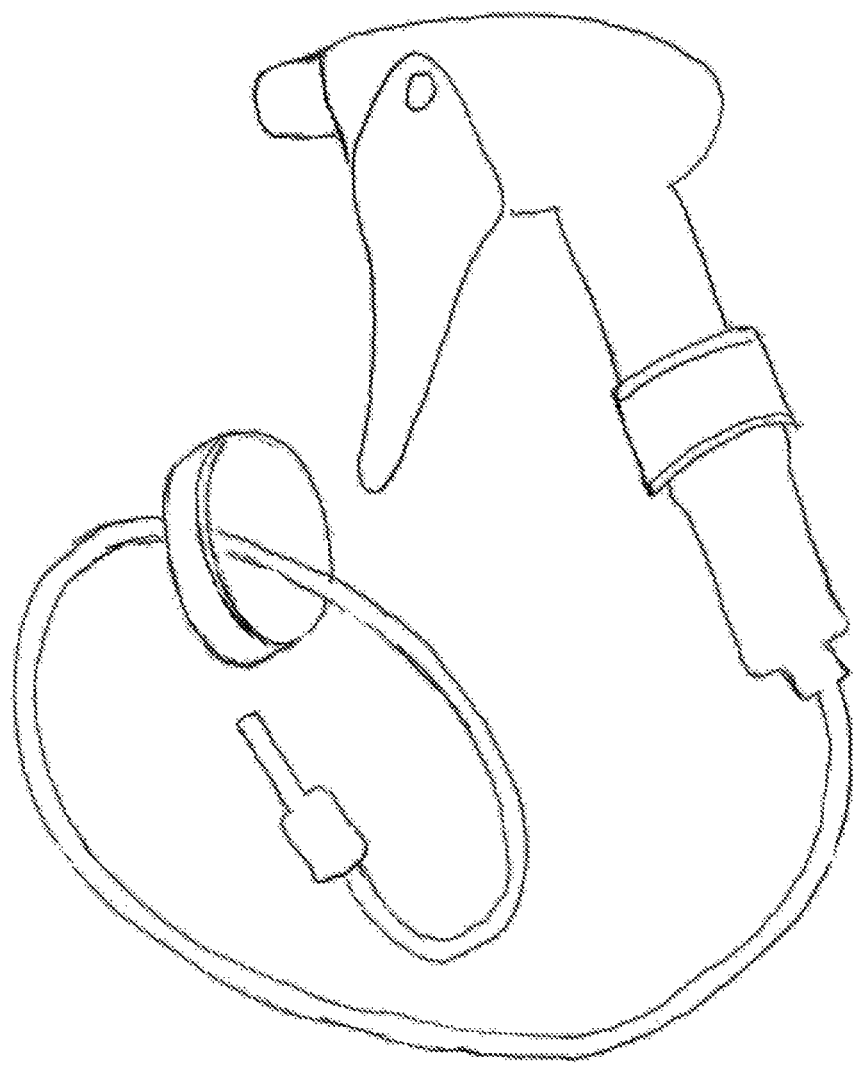
FIG. 15F illustrates a transferring member of the bottle apparatus, in accordance with one or more embodiments of the present disclosure.

FIGS. 5-14 illustrates an additional/alternative embodiment of the bottle apparatus 100 (e.g., bottle apparatus 500), in accordance with one or more embodiment. In particular, FIG. 5 illustrates a front perspective view of a bottle apparatus 500, in accordance with one or more embodiments of the present disclosure. In particular, FIGS. 6A-6B illustrates rear perspective views of the bottle apparatus 500, in accordance with one or more embodiments of the present disclosure. In particular, FIG. 7 illustrates a rear view of the bottle apparatus 500, in accordance with one or more embodiments of the present disclosure. In particular, FIG. 8 illustrates a cross-sectional front view of the bottle apparatus 500, in accordance with one or more embodiments of the present disclosure. In particular, FIG. 9 illustrates a first side view of the bottle apparatus 500, in accordance with one or more embodiments of the present disclosure. In particular, FIG. 10 illustrates a second side view of the bottle apparatus 500, in accordance with one or more embodiments of the present disclosure. In particular, FIGS. 11A-11B illustrate a measuring container of the bottle apparatus 500, in accordance with one or more embodiments of the present disclosure. In particular, FIG. 12 illustrates straps of the bottle apparatus 500, in accordance with one or more embodiments of the present disclosure. In particular, FIGS. 13A-13B illustrate top views of the bottle apparatus 500, in accordance with one or more embodiments of the present disclosure. In particular, FIG. 14 illustrates a bottom view of the bottle apparatus, in accordance with one or more embodiments of the present disclosure.

It is noted herein that the description of the various embodiments, components, and operations described previously herein with respect to bottle apparatus 100 should be interpreted to extend to the bottle apparatus 500. Further it is noted herein that the description of the various embodiments, components, and operations described herein with respect to bottle apparatus 500 should be interpreted to extend to the bottle apparatus 100.

In embodiments, the bottle apparatus 500 includes a body 502. The body 502 may include a plurality of sidewalls 504. The body 502 may further include a top wall 506 and a bottom wall 508. For example, the body 502 may include four sidewalls 504.

In some embodiments, a sidewall of the plurality of sidewalls 504 is curved. For example, as shown in FIGS. 5-6, a front sidewall of the plurality of sidewalls 504 may have a convex curvature. By way of another example, a rear sidewall of the plurality of sidewalls 504 may have a concave curvature. It is noted herein that the convex curvature of the front sidewall and the concave curvature of the rear sidewall may be different dimensions. For example, the front sidewall may have a more defined convex curvature than the rear sidewall, or vice versa.

In some embodiments, a sidewall of the plurality of sidewalls 504 is substantially flat. For example, as shown in FIG. 9, a right sidewall of the plurality of sidewalls may be substantially flat. By way of another example, as shown in FIG. 10, a left sidewall of the plurality of sidewalls 504 may be substantially flat.

Although not shown, the plurality of sidewalls 504 may include one or more grooves configured to provide a non-slip grip mechanism. Further, the plurality of sidewalls 504 may include one or more grip bands.

In some embodiments, the plurality of sidewalls 504 may be configured to couple to one or more transporting members 510. For example, as shown in FIGS. 7, 8, and 10, the plurality of sidewalls 504 may include one or more couplers 512 configured to couple to the one or more transporting members 510. For instance, a left sidewall and a right sidewall may include one or more couplers 512 configured to couple to the one or more transporting members 510. In another instance, as shown in FIG. 7-8, a top wall may include one or more couplers 512 configured to couple to the one or more transporting members 510. In this regard, as shown in FIG. 12, the one or more couplers 512 may be configured to couple to one or more straps 510. In this regard, the bottle apparatus 500 may be used as a backpack when utilizing the one or more straps 510 on a back of a user. It is noted herein that the one or more couplers 512 may be configured to couple to any type of transporting member 510 known in the art suitable for transporting the bottle apparatus 500 including, but not limited to, one or more straps, one or more slings, one or more belts, or the like.

In embodiments, the body 502 include a first body 502a and an additional body 502b. For example, one or more dividing members 514 may form at least a portion of the first body 502a and the additional body 502b. It is noted herein that although FIG. 8 illustrates the one or more dividing members 514 extending along the full length of the body, the one or more dividing members 514 may be any size (e.g., length) or thickness. For example, one or more dividing members 514 may extend between an interior surface of a top wall of the body, or bottle apparatus 500, to an interior surface of the bottom wall of the body, or the bottle apparatus 500.

The first body 502a may include a cavity 503a. The cavity 503a may be defined by an interior surface of the first body 502a and a first surface (e.g. a first side) of the one or more dividing members 514. For example, the cavity 503a may be defined by the left sidewall 504, the bottom wall 508, the top wall 506, and the first surface or first side of the one or more dividing members 514. The additional body 502b may include a cavity 503b. The cavity 503b may be defined by an interior surface of the additional body 502b and a second surface (e.g. a second side) of the one or more dividing members 514. For example, the cavity 503b may be defined by the right sidewall 504, the bottom wall 508, the top wall 506, and the second surface or second side of the one or more dividing members 514. In embodiments, the body 502 is configured to hold a plurality of products. For example, the body 502 may be configured to hold a plurality of products with different concentration levels. For instance, the cavity 503a of the first body 502a may be configured to hold a first product. In this regard, the cavity 503a of the first body 502a may be configured to hold a concentrated product. In another instance, the cavity of the additional body 502b may be configured to hold an additional product. In this regard, the cavity of the additional body 502b may be configured to hold a diluted product (e.g., the concentrated product and a diluent). The formation of the diluted product will be discussed further herein.

It is noted herein that the body 502 may be any shape known in the art suitable for holding at least one of the concentrated product, the diluted product, or the diluent. For example, the body 502 may be a hollow rectangle with a plurality of convex sidewalls. By way of another example, the body 502 may be a hollow rectangle with a plurality of substantially flat sidewalls. It is further contemplated that body 502 may be a generally cylindrical shape, or a generally spherical shape whereby the one or more sidewalls 104 may refer to portions of the generally cylindrical shape or generally spherical shape.

Referring to FIGS. 6B and 13B, in embodiments, the bottle apparatus 500 includes a plurality of openings 516. For example, the plurality of openings 516 may be arranged on the top wall 506 of the body 502. The bottle apparatus 500 may include any number of openings. For example, as shown in FIG. 13B, the first body 502a may include a first opening 516a. By way of another example, as shown in FIG. 13B, the additional body 502b may include a second opening 516b. By way of a further example, as shown in FIG. 13B, the additional body 502b may further include a third opening 516c. The first opening 516a of the first body 502a may be configured to receive a first product. For example, the first opening 516a may be configured to receive a concentrated product, such that the first body 502a contains the concentrated product. The second opening 516b may configured to receive a second product. For example, the second opening 516b may be configured to receive at least one of a diluent or a concentrated product. For instance, the second opening 516b may be configured to receive the concentrated product and the diluent, such that the additional body 502b contains the diluted product. The third opening 516c may be configured to couple to a transfer member 518 configured to transfer the diluted product within the additional body 502b. It is noted herein that the third opening 516c may be configured to receive at least one of the diluent or the concentrated product, such that the additional body 502b contains the diluted product. Further, it is noted herein that the second opening 516b may be configured to couple to a transfer member 518 configured to dispense the diluted product within the additional body 502b. Therefore, the above discussion should not be construed as limiting the scope of the present disclosure.

In embodiments, the bottle apparatus 500 includes one or more transfer members 518 configured to couple to a portion of the plurality of openings 516. FIGS. 15A-15F illustrate exemplary transfer members 116, 518, in accordance with one or more embodiments of the present disclosure. It is noted herein that the bottle apparatus 500 may include any number and type of transfer member 518 known in the art suitable for transferring one or more products (e.g., liquids, gels, or the like) including, but not limited to, one or more caps (e.g., flip caps, screw caps, snap caps, or the like), one or more spray dispensers (e.g., actuated spray dispensers, spray dispensers with a hose), one or more pumps (e.g., standard pumps, foam pumps, or the like), one or more plugs, one or more pressure sprayers, or the like. Therefore the transfer members shown in FIGS. 15A-15F should not be interpreted as a limitation on the scope of the present disclosure, but provided merely for illustrative purposes.

For example, as shown in FIGS. 5-8, the one or more transfer members 518 may include one or more pumps. For instance, a pump may be configured to couple to the first opening 516a, such that the pump is configured to dispense the concentrated product contained within the first body 502a. By way of another example, as shown in FIG. 5, the bottle apparatus 500 may include one or more caps (e.g., flip caps). For instance, a screw cap may be configured to couple to the second opening 516b, such that the screw cap is configured to allow a user to transfer a diluent into the additional body 502b via the second opening 516b. In this regard, a user may be able to mix the diluent and the concentrated to form the diluted product within the cavity of the additional body 502b. It is noted herein that the use of a cap allows a user to mix (e.g., shake, invert, or the like) the contents of the bottle apparatus 500 without one or more of the products leaking out of the plurality of openings 516 and/or one or more transfer members 518. By way of another example, as shown in FIGS. 5-10, the bottle apparatus 500 may include a spray dispenser coupled to an extendable hose. For instance, the spray dispenser may be an actuated spray dispenser.

By way of a further example, the one or more transfer members 518 may include one or more foam pump dispensers. By way of a further example, the one or more transfer members 518 may be a flip cap. By way of another example, the one or more transfer members 518 may be a plug dispenser. By way of an additional example, the one or more transfer members 518 may be a spray dispenser.

The one or more transfer members 518 may couple to the plurality of openings 516 via any mechanism known in the art. For example, in some embodiments, the plurality of openings 516 may include one or more threaded portions configured to couple to one or more threaded portions of the one or more transfer members 518. By way of another example, in some embodiments, the plurality of openings 516 may include one or more non-threaded portions.

In some embodiments, as shown in FIG. 13B, the bottle apparatus 500 may include one or more transfer member couplers 528. For example, the one or more transfer member couplers 528 may be reversibly coupled to a portion of the body 502. For instance, the one or more transfer member couplers 528 may include one or more fasteners (e.g., interlocking assembly, tab-and-groove assembly, tab-and-slot assembly, bolts, screws, or the like) configured to reversibly couple the one or more transfer member couplers 528 to the body 502b. It is noted herein that the one or more transfer member couplers 528 may be configured to couple to a portion of the body 502 to allow the bottle apparatus 500 to be easily transported without having portions of the transfer members (e.g., cords, hoses, or the like) dragging on the ground.

In some embodiments, the bottle apparatus 500 may include one or more pumps configured to create a pressurized container which may allow the one or more transfer members to transfer the plurality of products. For example, the bottle apparatus 500 may include one or more hand pumps. For instance, the bottle apparatus 500 may include one or more hand pumps on a sidewall of the plurality of sidewalls 504. By way of another example, the bottle apparatus 500 may include one or more motorized pumps. For instance, the bottle apparatus 500 may include one or more motorized pumps on a bottom wall of the body 502. In another instance, the bottle apparatus 500 may include one or more motorized pumps on a top wall of the body 502.

In some embodiments, the bottle apparatus 500 further includes one or more transparent windows 520 configured to allow a user to see the amount of the product within the body 502. For example, the first body 502a may include one or more transparent windows 520 configured to allow a user to see the amount of concentrated product within the cavity of the first body 502a. By way of another example, the additional body 502b may include one or more transparent windows 520 configured to allow a user to see the amount of diluted product within the cavity of the additional body 502b.

The one or more transparent windows 520 may include one or more measurement markers configured to allow a user to quantify the amount of product within the body 502. For example, the one or more measurement markers may be configured to allow a user to quantify the amount of concentrated product within the cavity of the first body 502a. By way of another example, the one or more measurement markers may be configured to allow a user to quantify the amount of diluted product within the cavity of the additional body 502b.

In some embodiments, the plurality of sidewalls 504 are configured to couple to one or more measuring containers 522. For example, the plurality of sidewalls 504 may include one or more recessed areas 524 configured to couple to the one or more measuring containers 522. For instance, the one or more recessed areas 524 may be shaped to complement the shape of the one or more measuring containers 522. As shown in FIG. 11B, the one or more measuring containers 522 may include one or more measuring lines configured to allow a user to measure an amount of product. For instance, a user may be able to measure an amount of concentrated product to add to at least one of the first body 502a or the additional body 502b. In another instance, a user may be able to measure an amount of diluent to add to the additional body 502b. In this instance, the user may measure an amount of concentrated product to add to the additional body 502b then a user may measure an amount of diluent to add to the concentrated product within the additional body 502b. Continuing with this instance, the user may determine the amount of the concentrated product and/or the diluent (or a ratio of diluent to concentrated product) based on a selected concentration of the diluted product.

By way of another example, as shown in FIG. 11A, the one or more measuring containers 522 may include one or more lips 523 configured to assist a user in pouring the products into the plurality of openings 516. For example, the one or more lips 523 may be shaped to allow a user to easily pour the products into the narrow a plurality of openings 516 without spilling the products.

It is noted herein that the measurement markers on the transparent window 520 and/or the one or more measuring lines on the measurement container 522 may include any measurement system known in the art suitable for measuring liquids or gels. For example, the measurement markers and/or lines may include, but are not limited to, ounces, pints, quarts, cups, or the like.

In some embodiments, the bottle apparatus 500 includes one or more handles 526. For example, the bottle apparatus 500 may include a handle 526 coupled to the top wall 506 of the body 502.

In some embodiments, although not shown, the bottle apparatus 500 includes one or more wheels. For example, the bottle apparatus 500 may include four wheels coupled to the bottom wall 508 of the body 502. By way of another example, the bottle apparatus 500 may include two wheels coupled to the bottom wall 508 of the body 502.

Although not shown, the bottle apparatus 500 may include a telescoping handle and at least two wheels. In this regard, a user may transport the bottle apparatus 500 via the wheels by pulling the bottom apparatus 500 with the telescoping handle.

The bottle apparatus 100, 500 may be formed of any material known in the art. For example, the bottle apparatus 100, 500 may be formed of one or more plastics. For instance, the bottle apparatus 100, 500 may be formed of polyethylene terephthalate (PETE), polyvinyl chloride (PVC), polypropylene (PP), polystyrene (PS), or the like. By way of another example, the bottle apparatus 100, 500 may be formed of glass. By way of a further example, the bottle apparatus 100, 500 may be formed of one or more metals.

It is contemplated that the bottle apparatus 100, 500 when used for health and beauty products, or household cleaning products, there is a financial gain in the way of saving money, since less product will need to be purchased. When the bottle apparatus 100, 500 is used for health and beauty products, or household cleaning products, since less product will need to be purchased, this will benefit our environment due to less waste in the landfill from bottles being discarded. When the bottle apparatus 100, 500 is used for industrial products, lawn and garden products, and farming/agriculture products, there is the convenience of not needing to carry two bottles or needing to retrieve the concentrated bottle when the diluted solution needs replenished. It is contemplated that the bottle apparatus 100 may be utilized in the food industry, particularly with the use of concentrated beverages, which could be mixed with a diluent, such as water, to produce a drinkable product.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific example is intended to be representative of its class, and the non-inclusion of specific components (e.g., operations), devices, and objects should not be taken as limiting.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A bottle apparatus, comprising:
a body, wherein the body includes a plurality of sidewalls, wherein the body is divided into a first body and an additional body via one or more dividing members, wherein a cavity of the first body is defined by an interior surface of the first body and a surface of the one or more dividing members, wherein a cavity of the additional body is defined by an interior surface of the additional body and another surface of the one or more dividing members, wherein the cavity of the first body is configured to hold a concentrated product, wherein the cavity of the additional body is configured to hold the concentrated product and a diluent to form a diluted product;
a plurality of openings, wherein the plurality of openings are arranged on a top wall of the body; and
one or more transfer members, wherein the one or more transfer members are configured to couple to a portion of the plurality of openings,
wherein the plurality of openings include a first opening configured to couple to a first transfer member, the first transfer member including a pump that dispenses the concentrated product into a second opening of the plurality of openings, the second opening located above the cavity of the additional body, the second opening including a cap,
wherein the diluted product of the additional body is formed by diluting the concentrated product dispensed from the first transfer member of the first opening into the second opening with the diluent supplied through the second opening of the additional body,
wherein the plurality of openings include a third opening configured to couple to an additional transfer member, the additional transfer member configured to dispense the diluted product, the additional transfer member including one of a pump or spray dispenser.

2. The apparatus of claim 1, wherein the plurality of openings include one or more threaded portions configured to couple to one or more threaded portions of the one or more transfer members.

3. The apparatus of claim 1, wherein the plurality of openings are non-threaded.

4. The apparatus of claim 1, wherein the bottle apparatus further comprises:
one or more transparent windows, wherein the transparent windows are configured to allow a user to see an amount of at least one of the concentrated product, the diluted product, or the diluent in at least one of the first body or the additional body.

5. The apparatus of claim 4, wherein the one or more transparent windows include one or more measurement markers.

6. The apparatus of claim 1, wherein the bottle apparatus further comprises at least one of:
one or more wheels, one or more handles, or one or more straps.

7. The apparatus of claim 1, wherein the bottle apparatus further comprises:
one or more grip bands, wherein the one or more grip bands are coupled to a portion of the body.

8. The apparatus of claim 1, wherein the bottle apparatus further comprises:
one or more grooves arranged on a sidewall of the plurality of sidewalls body.

9. The apparatus of claim 1, wherein the body further comprises:
one or more recessed areas configured to couple to a measuring container.

10. The apparatus of claim 1, wherein the cap is at least one of a snap cap, a screw cap, or a flip cap.

* * * * *